United States Patent [19]

Sakamoto et al.

[11] 4,445,146

[45] Apr. 24, 1984

[54] DIGITAL TRACKING CONTROL SYSTEM FOR VIDEO TAPE REPRODUCING APPARATUS

[75] Inventors: Hitoshi Sakamoto, Zama; Daijiro Okihara, Hadano, both of Japan

[73] Assignee: Sony Corporation, Tokyo, Japan

[21] Appl. No.: 347,486

[22] Filed: Feb. 10, 1982

[30] Foreign Application Priority Data

Feb. 14, 1981 [JP] Japan ................................. 56-20387

[51] Int. Cl.³ ....................... H04N 5/78; G11B 21/10
[52] U.S. Cl. .................................... 360/10.3; 360/77; 360/78
[58] Field of Search .................. 360/10.1, 10.2, 10.3, 360/70, 75–78

[56] References Cited

U.S. PATENT DOCUMENTS

| | | | |
|---|---|---|---|
| 4,287,538 | 9/1981 | Sakamoto et al. | 360/10.2 |
| 4,293,879 | 10/1981 | Heitman et al. | 360/10.3 |
| 4,361,857 | 11/1982 | Sakamoto | 360/77 |

Primary Examiner—Aristotelis M. Psitos
Attorney, Agent, or Firm—Lewis H. Eslinger; Alvin Sinderbrand

[57] ABSTRACT

In an apparatus for reproducing video signals recorded in successive parallel tracks extending obliquely on a record tape, which apparatus includes a rotary head repeatedly scanning across the tape generally in a direction along the tracks for reproducing the signals recorded therein while the tape is advanced longitudinally at a selected speed for achieving a desired reproducing mode, and a head deflecting device, such as, a bi-morph leaf, responsive to a drive voltage for deflecting the head in a direction transverse to said direction along the tracks; a tracking control system is provided with a circuit for detecting a deviation of the reproducing tape speed from a normal speed, preferably by detecting a frequency deviation of a sync signal included in the signals reproduced by the rotary head when scanning one of the tracks, and providing a first digital output in correspondence thereto, a circuit for detecting a phase deviation of a sync signal included in the reproduced signals, for example, the reproduced vertical sync signals, in respect to a reference sync signal and providing a second digital output in correspondence thereto, adders digitally adding the first and second digital outputs for providing an added output comprised of a plurality of bits, and a decoder responsive to only the upper bits of such added output for providing therefrom a signal which is applied to the head deflecting device as part of said drive voltage for determining the next track to be scanned by the rotary head.

21 Claims, 17 Drawing Figures

FIG. I

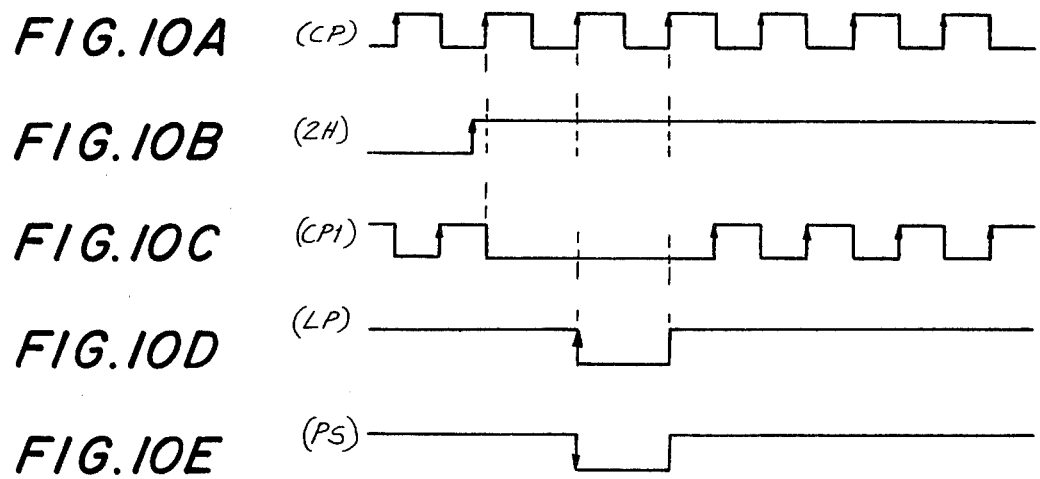
FIG.10A (CP)
FIG.10B (2H)
FIG.10C (CP1)
FIG.10D (LP)
FIG.10E (PS)
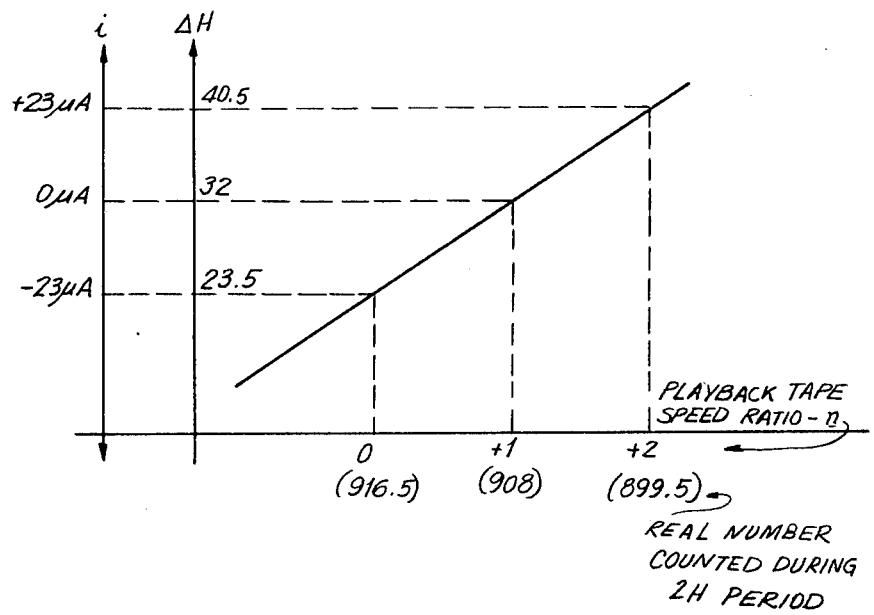
FIG. 11

DIGITAL TRACKING CONTROL SYSTEM FOR VIDEO TAPE REPRODUCING APPARATUS

BACKGROUND OF THE INVENTION

1. Field of the Invention

This invention relates generally to apparatus, such as a video tape recorder (VTR) of the so-called "helical-scan type", in which video or other information signals are recorded in successive parallel tracks which are skewed or extend obliquely on a magnetic tape and, more particularly, is directed to an improved tracking control system by which a magnetic head or other transducer in such apparatus is made to accurately scan the record track or tracks for reproducing the video or other information signals recorded therein.

2. Description of the Prior Art

In a helical-scan VTR, the magnetic tape extends helically about at least a portion of the periphery of a guide drum and is adapted to be moved or advanced in the longitudinal direction of the tape while at least a portion of the guide drum is rotated, and the transducer or magnetic head is mounted on a rotated portion of the guide drum so as to rotate with the latter and thereby repeatedly scan across the tape in a path at an angle to the longitudinal direction of the tape. During the recording operation of the VTR, the angle between the scanning path, and hence each record track, and the longitudinal direction of the tape is dependent on the rotational speed of the rotary head and also the speed at which the magnetic tape is longitudinally advanced. If the speed and direction of advancement of the tape are the same during a reproducing operation, as during a recording operation, then the scanning path of the head will be parallel to each record track and a servo system may control either the speed of tape advancement or the rotary speed of the head for obtaining proper scanning of the head along each track. However, if the speed and direction of advancement of the magnetic tape are not the same during the reproducing operation as during the recording operation, then the scanning path of the magnetic head during reproducing will not coincide with a record track on the tape during each movement of the head across the tape and, accordingly the recorded video or other information signals may not be correctly or accurately reproduced.

Various tracking control or servo systems have been proposed for maintaining correct tracking or scanning of the record tracks by the rotary head. In the most desirable of these known arrangements, for example, as disclosed in U.S. Pat. Nos. 4,163,994, 4,172,264, 4,237,399, 4,287,538 and 4,296,443, each having a common assignee herewith, the head is mounted on the rotary drum portion by way of an electro-mechanical head deflecting device, such as, a bi-morph leaf, for deflecting the head in a direction normal to the plane of its rotation, that is, in a direction which is transverse in respect to the direction along each of the record tracks. In the reproducing mode of the VTR, any deviation or tracking error of the head scanning path relative to a recorded track is detected and an electrical drive signal for the bi-morph leaf is correspondingly controlled to correct the tracking error with a view to obtaining a reproduced picture of high quality free of so-called guard band noise even in non-normal reproducing modes, such as, still, slow, fast or reverse reproducing modes.

In the non-normal or speed-varied reproducing modes, that is, when the speed and/or direction of advancement of the magnetic tape are not the same during reproducing as during recording, either a track is scanned a plurality of times in a so-called overlapped or repeat tracing for a slow-motion or still motion reproducing mode, or the tracks are only scanned at intervals in a so-called skip or interval tracing for a quick or fast motion reproducing mode. In the course of each of the foregoing non-normal reproducing modes, it is necessary that, at certain times, the playback head be made to jump or fly-back with a pitch corresponding to an integer or whole multiple of the track pitch between the terminal end of a track which has been scanned and the initial end of the track which is to be next scanned or traced.

Generally, it is desired to determine the mode of such head jump, which includes its direction and amount, so that there will be the smallest possible deflection of the bi-morph leaf from its neutral or zero position to cause the head to trace the initial end of the next track to be scanned. Moreover, the mode of the head jump before each trace is generally predetermined so that the maximum deflection of the bi-morph leaf required to make the head accurately scan the selected track at any time during such trace will not exceed a predetermined amount. For example, in published Japanese Patent Application No. 117,106/1977 (Applicant: Ampex Corporation), it is disclosed to control the head jump by detecting the drive voltage to the bi-morph leaf as an indication of the deflection of the head required for accurately scanning a record track thereby, and, when the detected voltage reaches a predetermined value, such as that at which the head deflection approaches, or would in the next trace approach the physical limit of that possible with the bi-morph leaf or other transducer deflecting device supporting the head, the drive voltage for the bi-morph leaf is suitably controlled to cause the mode of head jump required to select, as the next track to be scanned, one that avoids unacceptable deflection of the bi-morph leaf. However, in the foregoing arrangement, the tracing form or pattern of head jumps that is achieved will change undesirably when the bi-morph leaf or other head deflecting device becomes saturated or when its sensitivity, that is, the ratio of its deflection to a unit change in the drive voltage, or the linearity of its control circuit varies with time or age.

In order to avoid the foregoing problem, it has been proposed, for example, in U.S. Pat. Nos. 4,287,538 and 4,296,443, to control the mode of the head jump on the basis of a frequency and phase of the reproduced signal, for example, the frequency and phase of the reproduced sync signals, which change with movements of the tape relative to the head. Since the scanning direction of the head is skewed relative to the longitudinal direction of movement of the tape, displacement of the head by the bi-morph leaf or head deflecting device in the direction normal to the scanning direction has a component in the longitudinal direction of the tape, and hence is equivalent to a movement of the tape relative to the head so as to cause corresponding changes in the frequency and phase of the reproduced sync signals. It will be appreciated that such changes in the frequency and phase of the reproduced sync signals are dependent on the actual displacement of the head and are not influenced by the condition of the bi-morph leaf or of its control circuit. Therefore, at least in theory, controlling the mode of the head jump on the basis of the frequency and phase of the reproduced sync signals should provide stable and accurate head jump control. However, relatively complicated circuits are required for determining the desired mode of head jump on the basis of the frequency and phase of the reproduced sync signals so that the theoretically possible stability and accuracy may not be achieved. This is particularly true when analog data as to the frequency and phase of the reproduced sync signals are compared in respective comparators with external or reference sync signals, in which case the expected errors in analog processing and the instability due to temperature characteristics of the respective circuit elements may adversely affect the accuracy of head jump control.

OBJECTS AND SUMMARY OF THE INVENTION

Accordingly, it is an object of this invention to provide an apparatus for reproducing information signals recorded in successive parallel tracks on a record medium with an improved tracking control or servo system which avoids the above-described problems associated with the prior art.

More particularly, it is an object of this invention to provide a tracking control or servo system, as aforesaid, by which information signals recorded in successive parallel track on a tape or other record medium can be correctly reproduced in various non-normal reproducing modes, regardless of the reproducing speed ratio, that is, the ratio of the tape speed during reproducing to the normal or recording tape speed.

Another object is to provide a tracking control or servo system, as aforesaid, which employs extremely simple digital information processing for controlling the so-called head jump so that the tracking control system may be of correspondingly simplified construction.

In accordance with an aspect of this invention, an apparatus for reproducing video signals recorded in successive parallel tracks formed obliquely on a record tape, comprises a rotary head movable across the tape in a direction generally along the tracks for reproducing the signals recorded therein, head deflecting means, such as, a bi-morph leaf, responsive to an electrical drive signal for deflecting the head in a direction transverse to the direction along the tracks, first detecting means for detecting a deviation of the tape speed during reproducing from a normal speed therefor and providing a corresponding first output, preferably by detecting a frequency deviation of the horizontal sync signals included in the signals reproduced by the rotary head when scanning one of the tracks, second detecting means for detecting a phase deviation of a sync signal included in said reproduced signals, for example, the reproduced vertical sync signals, in respect to a reference sync signal and providing a corresponding second output, means digitally adding said first and second outputs of the first and second detecting means for providing a digitally expressed added output comprised of a plurality of bits, and decoding means responsive to only upper bits of said added output for providing therefrom a respective jump signal which is included in the drive signal applied to said head deflecting means at the completion of the scanning of a track by the rotary head for determining the next track to be scanned.

In a preferred embodiment of the invention, the first detecting means includes means for establishing, as said first output, a digitally expressed numerical value corresponding, in accordance with a first scale, to deviation of the frequency of the reproduced horizontal sync signals in respect to the reference frequency, and the second detecting means includes means for establishing, as said second output, a digitally expressed numerical value corresponding, in accordance with a second scale, to the phase deviation; the decoding means determines the amount and polarity of the jump signal on the basis of regions of a coordinates plane having the first and second scales as the abscissa and ordinate, respectively, with such regions corresponding to respective different conditions of said jump signal and being divided from each other by boundary lines each of which represents a respective constant numerical value of the added output; said first and second scales are selected so that said boundary lines are inclined at 45° in respect to the coordinates; and an origin of the coordinates is selected so that the constant numerical value of the added output representing each of the boundary lines corresponds to a carry of the least significant of said upper bits to which the decoding means is responsive.

The above, and other, objects, features and advantages of the invention, will be apparent in the following detailed description of an illustrative embodiment thereof which is to be read in connection with the accompanying drawings.

BRIEF DESCRIPTION OF THE DRAWINGS

FIGS. 10A–10E are wave-forms to which reference will be made in explaining the operation of the trace control circuit of FIG. 9;

FIG. 11 is a graph showing the relation of output data from a latch in the circuit of FIG. 9 representing deviation of the frequency of reproduced sync signals to the count of a counter in such circuit which represents the ratio of the reproducing tape speed to the normal or recording tape speed;

DETAILED DESCRIPTION OF A PREFERRED EMBODIMENT

Figure 1:
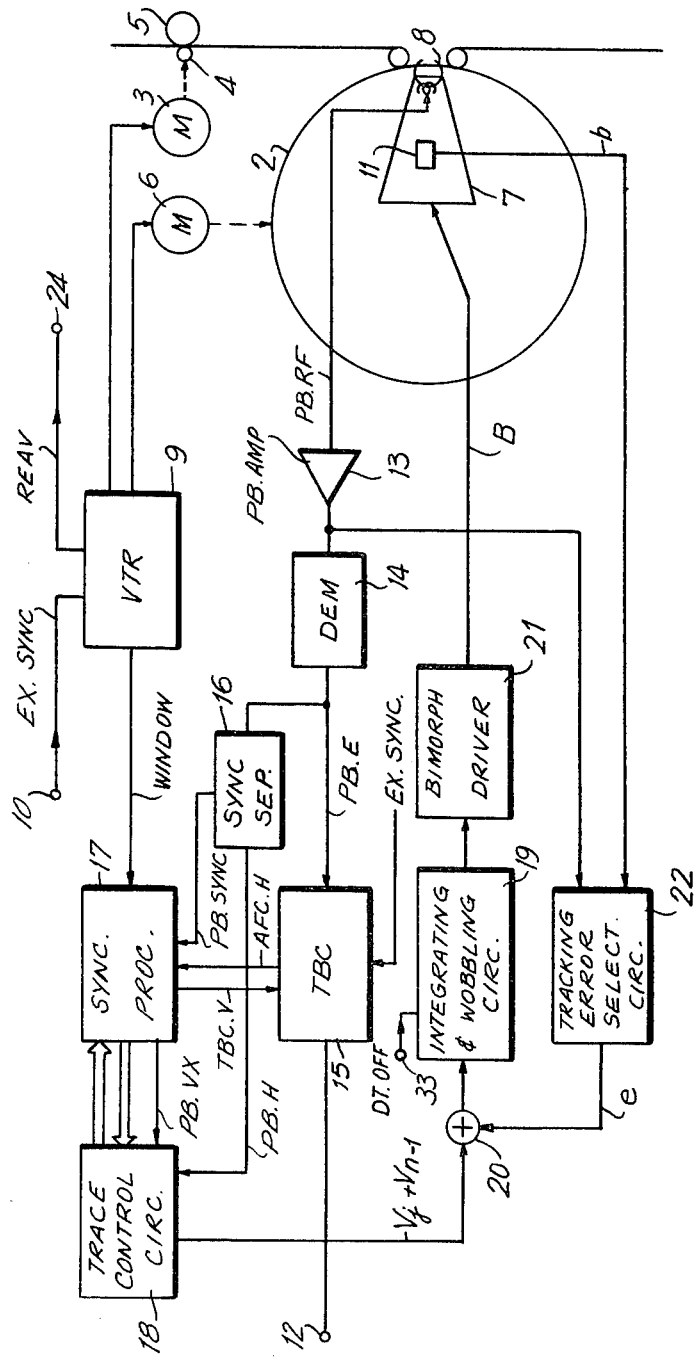
FIG. 1 is a block diagram of a tracking control or servo system in a VTR according to an embodiment of this invention.

Referring initially to FIG. 1, it will be seen that, in a helical scan type VTR that may be advantageously provided with a tracking control or servo system according to this invention, a magnetic tape 1 is wound obliquely, over an angular range of approximately 360 degrees, about the outer periphery of a guide drum 2. A capstan motor 3 drives a capstan 4 which, in cooperation with a pinch roller 5, drives the tape 1 longitudinally at any selected speed. At least a portion of drum 2 is rotary and is provided with a video head 8 which is supported by a cantilevered bi-morph leaf 7, for example, formed of two piezo-ceramic plates joined to each other. A motor 6 drives the rotary portion of drum 2, and hence head 8, at a predetermined rotational speed under the control of a VTR servo system 9 which receives an external reference synchronizing signal EX.-SYNC applied from a suitable external source to a terminal 10, and which causes drum motor 6 to be rotated at 60 Hz or RPS in synchronism with a reference vertical synchronizing signal included in EX.SYNC. The head 8 attached to the free end of bi-morph leaf 7 has its reproduced output PB-RF (FM signal) applied through a playback amplifier 13 to a demodulator 14 in which it is demodulated to a reproduced video signal PB.E. The reproduced video signal has its time base corrected by a time base corrector 15 and then is made available at an output terminal 12.

A reproduced synchronizing signal PB.SYNC is separated by a sync separator 16 from the output of demodulator 14 and is applied to a sync processing circuit 17 which forms synchronizing signals necessary for a trace control circuit 18 and a synchronizing signal TBC.V necessary for time base corrector 15. As will appear hereinafter, trace control circuit 18 provides, as its output, a jump signal $V_j$ necessary for optimum tracing and an inclination error signal $V_{n-1}$ which are converted, in an integrating and wobbling circuit 19, into a jump voltage and an inclination compensation voltage which are fed through a drive circuit 21 to bi-morph leaf 7, whereby the position of magnetic head 8 is controlled to effect tracing control according to the reproducing speed ratio n. The reproduced output PB-RF of magnetic head 8 and the output b of a strain gauge 11 on bi-morph leaf 7 are fed to a tracking error detecting circuit 22 which may be similar to that disclosed in U.S. patent application Ser. No. 06/152,117 filed May 21, 1980 and now U.S. Pat. No. 4,361,857, and having a common assignee herewith, and which, on the basis of the signals PB-RF and b, forms a tracking error signal e according to the discrepancy between the track and the scanning path. The tracking error signal e is added to the jump signal $V_j$ and the inclination error signal $V_{n-1}$ in an adder 20 in advance of integration and wobbling circuit 19 so as to be applied through the latter to bi-morph leaf 7 for correcting the tracking error.

In the recording operation of the above-described VTR, tape 1 is advanced longitudinally at a predetermined speed, so that video or other information signals are recorded by head 8 in a series of parallel magnetic tracks T (FIG. 2) at a predetermined slant angle or inclination to the longitudinal direction of the tape. In the normal reproducing mode wherein the reproducing tape speed is the same as the recording speed, the inclination of the scanning path of the reproducing head 8 is the same as the inclination of the tracks T in FIG. 2, and therefore a normal reproduced signal can be obtained by controlling the rotary phase of head 8 by means of a drum servo or a capstan servo included in servo system 9 so that the successive scanning paths of head 8 will coincide with successive tracks T on tape 1. In a playback or reproducing mode employing an arbitrary tape speed which is different from the recording speed, both the phase and slant angle or inclination of the head scanning path do not coincide with the phase and slant angle, respectively, of the recorded tracks T. Some examples are shown on FIG. 2, in which dot-dash lines A, B and C respectively represent scanning paths of the head for reproducing in reverse-motion, still-motion and 2.5/1 fast-forward motion modes. Therefore, in such different or arbitrary speed reproducing modes, it is necessary to effect compensations of both the inclination and phase of the scanning path by providing a control or drive signal to bi-morph leaf 7 to deflect the head 4 in the direction normal to the head scanning path. In addition to such compensation, it is necessary to effect tracing track selecting in order to perform overlap-tracing or interval-tracing. Overlap-tracing is required in a slow-motion playback mode employing a tape speed than the recording speed, and in which the head repeatedly traces or scans a recorded track and then the head scans the next track on the tape. Interval-tracing is required in a fast-motion playback mode employing a tape speed faster than the recording speed, and in which one or several tracks are skipped and the head only scans the tracks at intervals. Thus, when compensating for phase and slant errors, the optimum one of the recorded tracks must be traced to correctly effect such overlap-tracing or interval-tracing while ensuring that the vertical position of head will not go beyond the maximum permissible deflection for the tracking operation. The alteration of the track being traced from one track to the next desired one is hereinafter called "track jump".

Next, the condition for track jump, that is, the optimum condition to minimize the amplitude of head deflection or deviation, will be considered.

As noted above, tracking error compensation includes both a phase error compensation and a slant error compensation. In respect to the phase error compensation, when the head 8 is going to scan one of the paths A, B or C shown by dot-dash lines on FIG. 2, a maximum deflection of $\pm\frac{1}{2}$ pitch (one pitch is equal to the distance between adjacent record tracks) is the most that may be required to move the head onto the starting point of a recorded track to be traced. In other words, when the head is centered between adjacent tracks at the start of its scanning movement, the phase error is maxmum and may be corrected by a $\pm\frac{1}{2}$ pitch deflection. If the arrangement is such that the head can be deflected to both sides of the track T by bi-morph leaf 7 which is controlled to selectively bend upward and downward from its neutral position, then a head deflection amplitude of one pitch, in its peak to peak value, is necessary for effecting the phase compensation irrespective of the ratio of the tape speed during reproducing to the tape speed during recording.

On the other hand, the slant compensation required to ensure that, once the head begins to trace a desired track, it will trace that one track from beginning to end, will vary in accordance with the tape speed during reproducing. When the ratio of playback or reproducing tape speed to the recording speed is represented by n, the required slant compensation is as follows:

(n−1) pitch (in the case of n≧1)          (1a) or (1−n) pitch (in the case of n<1)          (1b).

Consequently, a phase compensation of 1 pitch and a slant compensation of (n−1) pitches may be required for correction of the scanning path of the head. Since the phase compensation has no relation to the playback tape speed, the phase and slant compensations are independent of each other. Thus, the necessary maximum amplitude P of the head deflection is represented by sum of the compensation components as follows:

$P = [(n-1)+1]$ pitch for $n \geq 1$          (2a)

$P = [(1-n)+1]$ pitch for $n < 1$          (2b).

When the bi-morph leaf 7 is equally deflectable in the upward and downward directions, the deflection amplitude P of equations (2a) and (2b) may be equally distributed between an upper range and a lower range at opposite sides of a neutral position or surface on which bi-morph leaf 7 supporting the head is mounted. The boundaries of such upper and lower ranges are represented by $P = \pm \frac{1}{2}[(n-1)+1]$ for $n \geq 1$          (3a) or $P = \pm \frac{1}{2}[(1-n)+1]$ for $n < 1$          (3b).

The optimum deflection is achieved by bending bi-morph leaf 7 in the range defined between such upper and lower boundaries. The foregoing is a necessary condition to reduce the required deflection amplitude of the bi-morph leaf to the absolute minimum.

When the playback speed ratio n is an integer, interval-tracing, in which one or several recorded tracks are skipped, is effected with a track jump of n-pitches after each tracing or scan of a track. For example, in 2/1-fast-motion reproduction, tracing at intervals of 2-pitches or on alternate tracks is effected. Accordingly, when the playback speed ratio n is an integer, the "track jump pitch" or "trace pitch", that is the distance between adjacent tracing tracks, may be represented by n pitches. However, when the speed ratio n is not an integer, for instance, if n is equal to 1 divided by an integer, one of the recorded tracks is repeatedly traced n-times, and then a track jump of one pitch, that is, to the next track, is effected. Therefore, when the speed ratio n is not an integer, the "track jump pitch" cannot be represented by n.

Since the head is not allowed to jump from one track to another in the middle of tracing or scanning a track, the track jump pitch is always an integral multiple of one pitch. Accordingly, when the speed ratio n is not an integer, n must be represented by two integers l and m as follows:

$$n = \frac{l \times x + m \times y}{x + y} \quad (4)$$

where l and m are determined by the inequality (n+1)>l>(n−1) and x and y are appropriate integers. The following table shows values of l and m obtained from equation (4) for various ranges of n:

TABLE I

| VALUES OF l AND m FOR VARIABLE n | | |
|---|---|---|
| 1 > n > 0 | l = 1 | m = 0 |
| 2 > n > 1 | l = 2 | m = 1 |
| 3 > n > 2 | l = 3 | m = 2 |
| 0 > n > −1 | l = 0 | m = −1 |
| −1 > n > −2 | l = −1 | m = −2 |

The numbers l and m represent the necessary track jump pitches and x and y represent the number of times the jumps of pitches l and m are respectively effected. The combination of the track jumps of pitches l and m carried out x-times and y-times, respectively, in each unit trace mode, serves to provide a track jump of n-pitches on the average, and thereby achieves playback at the speed ratio n.

For example, when n is equal to 2.5 for the 2.5/1-fast-motion playback mode, equation (4) leads to l=3, m=2, x=1 and y=1. In that case, the tracking operation is performed by crrying out alternate single track jumps of 3-pitches and 2-pitches. Thus, for the 2.5/1 fast-motion playback mode in which n=2.5, each cycle of the tracking operation involves two scans during which there is a track jump of 3-pitches and then a track jump of 2-pitches, respectively, leading to a total track jump of 5-pitches for two track jumps, or an "average" track jump of 2.5 pitches.

When n is equal to 2.25, equation (4) leads to l=3, m=2, x=1 and y=3. As shown on FIG. 4, in that case, each cycle of the tracking operation involves a single track jump of 3-pitches and then, a track jump of 2-pitches which is repeated 3-times. In this case, each cycle of the tracking operation achieves a total track jump of 9-pitches in 4 track jumps leading to an "average" track jump of 2.25 pitches.

Therefore, in the arbitrary speed playback, predetermined numbers of track jumps of l pitches and m pitches are carried out to achieve the desired tracking operation. In certain particular cases, when the playback speed ratio n is an integer or |n|<1, l or m becomes zero. The actual amounts of head deflection needed to effect the track jumps of l pitches and m pitches are l−1=m pitches and m−1 pitches, respectively, as the head jumps from the concluding end of a track being scanned to the starting end of a next track to be scanned, and the vertical positions of the concluding and starting ends of adjacent recorded tracks agree with each other on the peripheral surface of the head drum assembly. In other words, in the absence of any deflection of the head by its supporting bi-morph leaf, a so-called track jump of 1-pitch is effected as the head moves from the concluding end of one track to the starting end of the next track.

The head deflections of l−1=m pitches and m−1 pitches are hereinafter called an "m−jump or skip" and "(m−1)-jump or skip", respectively. The larger one of the m−jump and (m−1)-jump, considered in absolute values thereof, is referred to as the "large jump or skip" and the smaller one is referred to as the "small jump or skip" from which it follows that the m-jump is the large jump in the case of n≦1 and the (m−1)-jump is the large jump in the case of n<1.

Next, consideration will be given to the sequence or condition of the track jumps needed to maintain deflection of the head within the ranges specified by equations (3a) and (3b). As shown in FIG. 5 which illustrates the waveform of the voltage applied to bi-morph leaf 7 for the tracing cycle or pattern of FIG. 4, but which is also equivalent to the resulting deflection of head 7, after a large jump or small jump is carried out to move the head onto the beginning or starting end of a desired recorded track, the head scans such track while the slant compensation of |n−1| pitches is effected, with the deflections of the bi-morph leaf for the track jump and the slant compensation being carried out in opposite directions for each other.

Figure 4:
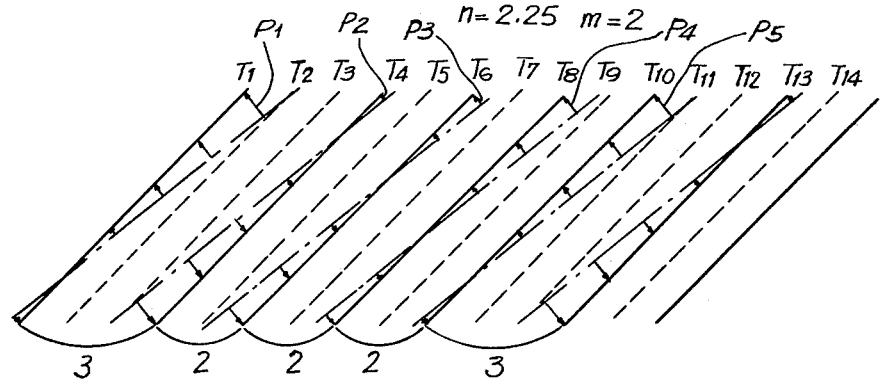
FIG. 4 is a chart showing the tracing mode for a fast-forward reproducing mode.
Figure 5:
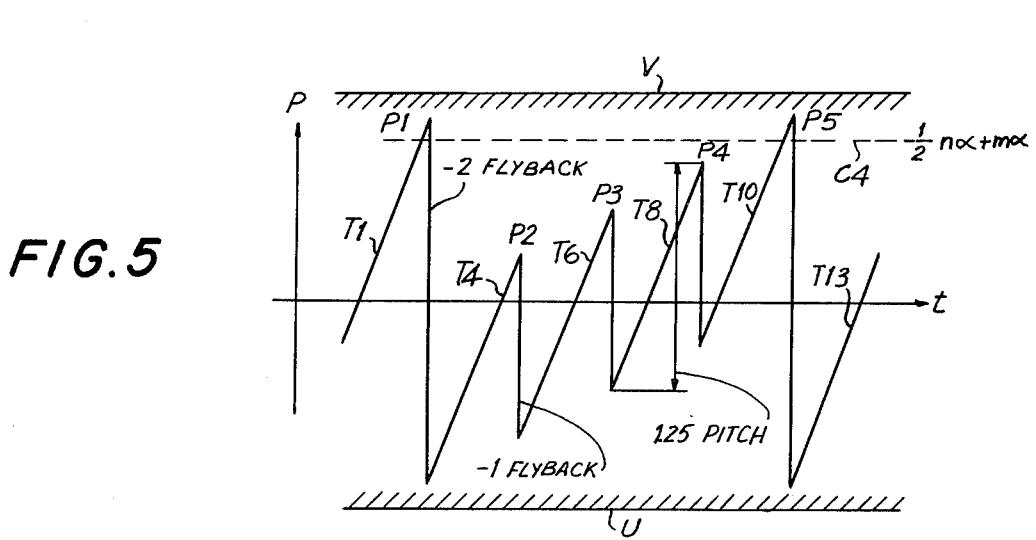
FIG. 5 is a waveform of a control voltage applied to a bi-morph leaf for deflecting the rotary head of the VTR of FIG. 1 in the manner shown on FIG. 4.

As shown by dot-dash lines on FIG. 4, in the 2.25/1-fast playback mode there illustrated, each head scanning path has a slant error of 1.25-pitches in respect to the recorded tracks $T_1$, $T_2$-. It is assumed that the deflection $P_1$ of head 8 at the concluding end of the scanning of track T for correcting the phase error and slant error results in condition $P_1 > -\frac{1}{2}n+m$. In view of the foregoing, it is necessary to provide a flyback voltage $V_m$ corresponding to m=2 pitches and which is applied to bi-morph leaf 7 to deflect head 8 by −2 pitches onto the beginning end of the track $T_4$ Then track $T_4$ is traced or scanned with the slant compensation of 1.25 pitches. At the concluding end of track $T_4$, the head deflection $P_2$ results in the condition $P_2 < -\frac{1}{2}n+m$, and, according, a flyback voltage $V_m$ − corresponding to m−1=1 pitch is produced to cause flyback of head 8 of −1 pitch onto the beginning end of the track $T_6$. After that, the scanning of a track and the flyback of −1 pitch are repeated two times, and then, the flyback of −2 pitches is again carried out, as shown on FIG. 5.

In determining the deflecting cycle for any of the playback modes, the below conditions (1) and (2) have to be observed:

Condition (1)

The deflection for the large jump is l−1=m pithes when the speed ratio n is greater than 1. Therefore, the large jump is permissible only when the point at which the head is situated before jump, is at least l−1 or m pitches above the lower boundary defined by equations (3a) and (3b). If the deviation of the head from its neutral or undeflected position before the large jump is represented by $D_p$ (pitches), the head is deflected by the large jump to a point represented by $(D_p−m)$ pitches and which must be above the lower boundary. Thus, $(D_p−m) >$ lower boundary or $(D_p−m) > -\frac{1}{2}n$ so that, $$D_p > -\tfrac{1}{2}n+m \tag{5}$$

The above inequality (5) gives a condition necessary for the large jump in the case of n>1.

As for the slant compensation of (n−1) pitches necessary for proper tracing after the large jump, (n−1) is seen to be less than (l−1) from equation (4). Accordingly, if the deviation or deflection $D_p$ of the head before the large jump satisfies the above inequality (5) the deviation at the end of tracing is never beyond the permissible range.

In the case of n<1, the large jump is effected by a deflection of (m−1) pitches, where m is a negative integer. Thus, in the same manner as above, the head is deflected by the large jump from its starting position $D_p$ to a point $(D_p−m+1)$ pitches, which must be below the upper boundary defined by equations (3a) and (3b). Thus, $(D_p−m+1) <$ upper boundary or
$(D_p−m+1) < (-\tfrac{1}{2}n+1)$ so that, $$D_p < -\tfrac{1}{2}n+m \tag{6}$$

Condition (2)

For the small jump, the deflection is equal to (m−1) pitches, in the case of n>1. The slant compensation of (n−1) pitches which has been effected before the small jump is greater than the deflection of (m−1) pitches for small jump, so that deflection after the small jump is never beyond the deflection at the beginning of the tracing before the small jump.

As the slant compensation of (n−1) pitches necessary for the tracing after the small jump is greater than the small jump deflection of (m−1) pitches, care must be taken that the deviation or deflection at the end of the tracing followng the small jump is not beyond the upper boundary defined by equations (3a) and (3b). Consequently, the small jump is permissible only when the deviation or deflection of the head before effecting the small jump is below a position that is (n−m) pitches distant from the upper boundary. If the head is positioned at a point $D_p$ before the small jump, the head is deflected by the small jump and the following tracing to the point $D_{p'}−(m−1)+(n−1)$ which must be below the upper boundary. Thus, $D_{p'}−m+n <$ upper boundary or $D_{p'}−m+n < \tfrac{1}{2}n$ so that, $$D_{p'} < -\tfrac{1}{2}n+m \tag{7}$$

The above inequality (7) gives a condition necessary for the small jump in the case of n>1.

In the case of n<1, the small jump is effected by a deflection of m pitches. Thus, in the same manner as above, it can be determined that after the small jump and the subsequent tracing, the head deflection is $D_{p'}−m+(n−1)$, which must be above the lower boundary. Thus, $D_{p'}−m+n−1 >$ lower boundary or $D_{p'}−m+n−1 > \tfrac{1}{2}n−1$ so that, $$D_{p'} > -\tfrac{1}{2}n+m \tag{8}$$

As a result, a group of boundary lines defining the conditions for changeover between the large jump and the small jump are expressed as follows:

$$D_{p'} = -\tfrac{1}{2}n+m \tag{9}$$

where m is an integer given by the condition of $n \geq m \geq n−1$. The equivalent of such boundary lines are shown by dotted lines $C_0$, $C_1$, $C_2$, $C_3$, $C_4$-, in FIG. 6 in which deviations ΔH of the reproduced horizontal sync signal frequency in respect to a standard or reference horizontal sync frequency are plotted as the abscissas and deviations Δϕ of the phase of the reproduced vertical sync signals relative to a reference vertical sync signal are plotted as the ordinates.

Figure 3:
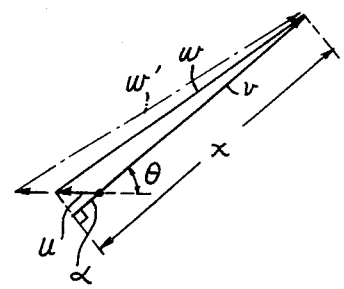
FIG. 3 diagrammatically shows speed vectors of the head and of the magnetic tape for a plurality of reproducing modes.

The equivalence between the values of deviation ΔH of the reproduced horizontal sync frequency and the reproduced tape speed ratio n will be apparent from FIG. 3, in which a vector v represents the rotational speed of the head 8 and a vector u represents the tape speed and the inclination angle of the tape 1 to the plane of rotation of the rotary portion of drum 2 is assumed to be $\phi$. In such case, $x = v + u \cdot \cos \phi$ is the scanning speed of the head relative to the tape during the recording made and is represented by the vector w. In other words, a recorded track is formed in the direction of the vector w.

If the tape speed u is changed from the normal recording speed in the reproducing mode, the scanning speed vector of the head is changed, both in inclination angle and in size, as indicated by the dot-dash line w' in FIG. 3. Even if the angular error (inclination error) is corrected by providing a ramp or slant compensation voltage to the bi-morph leaf 7, and the tracks T are scanned correctly as a result of this correction, the error in the relative scanning speed of the head remains uncorrected since the head 8 deflects only in the direction normal to the tracks T, so that the time base of a reproduced signal varies according to the scanning error.

For example, the relative scanning speed of the head in the still reproducing mode is equal to the rotational speed v of the head and is smaler by $u \cdot \cos \phi$ than the relative scanning speed x of the head in the recording mode. This decrease corresponds to a scanning length on the tape of $V \cdot u \cdot \cos \phi$ in one vertical scanning period (1V), which is equal to the arrangement deviation (H-alignment $\alpha$) in the scanning direction of each oblique track shown in FIG. 2. This length $\alpha$, when distributed to the horizontal scanning periods in each track, corresponds to $\alpha/262.5$ for each horizontal period, and if $\alpha$ is expressed in time as a multiple (for example, 2.5H) of the horizontal scanning period, the time base of each horizontal scanning period varies by $\alpha/262.5$. In other words, in the still reproducing mode, the period of a reproduced horizontal synchronizing (sync) signal is shorter by $\Delta H = -\alpha/262.5$ than the corresponding period H in the normal speed reproducing mode. Similarly, in the 2/1 -fast reproducing mode, the period of the horizontal synchronizing signal is increased by $\Delta H = +\alpha/262.5$ over H. Thus, in a speed-varied reproducing mode, the ratio n of the tape speed during reproducing to the normal tape speed can be detected as a time base variation $\Delta H$ (jitter of a reproduced signal) of the reproduced horizontal sync signal.

Figure 2:
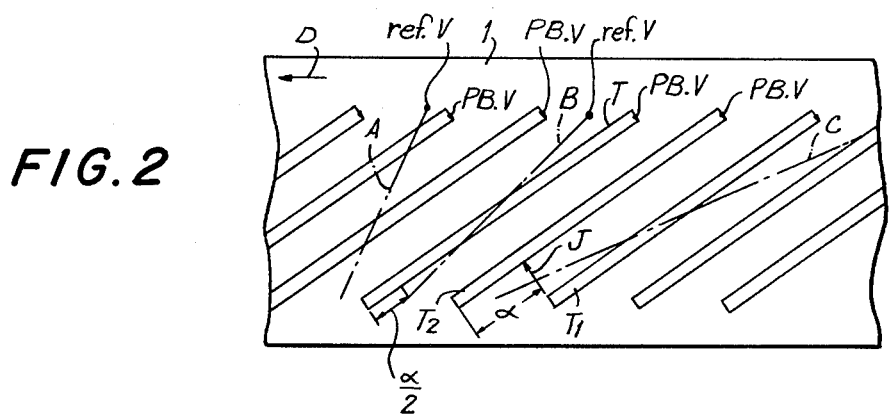
FIG. 2 is a partial plan view of a magnetic tape showing record tracks formed thereon by the VTR of FIG. 1.

For the same reason, the phase of the reproduced vertical synchronizing (sync) signal changes with respect to a reference vertical synchronizing signal in response to changes in the reproducing tape speed. For example, the rotary portion of drum 2 shown in FIG. 1 is rotated at 60 RPS while its rotational phase is servo-controlled on the basis of a reference vertical synchronizing signal ref. V included in the external sync signal EX.SYNC so that, for example, as shown in FIG. 2, a reference vertical synchronizing signal ref. V occurs at the terminal end of each scanning path, and a reproduced vertical synchronizing signal PB.V appears at the terminal end of each track T. In the still reproducing mode (scanning path B), the reproduced vertical synchronizing signal PB.V lags behind the reference vertical synchronizing signal ref. V by $\alpha$, that is, by 2.5H, and in the 2/1-fast reproducing mode (scanning path C and assuming tape 1 is moving in the direction of the arrow D on FIG. 2), the signal PB.V is advanced relative to the signal ref. V by $\alpha$. Of course, in the normal speed reproducing mode, the phases of signals BP.V and of ref.V are coincident with each other.

Such variation of the phase of reproduced vertical sync signal PB.V relative to the reference vertical sync signal ref.V with changes in the tape speed ratio n is a measure of the deflection or deviation of head 8 from its neutral position in response to the application to bi-morph leaf 7 of the inclination correction or compensation signal suitable for the respective value of ratio n.

Generally, the phase of reproduced vertical sync signal PB.V is varied by $(n-1)\alpha$ in respect to the reference vertical sync. signal ref.V if the head 8 begins to scan a track T at the beginning of such track on the tape. However, if there is a phase difference of ½ track pitch between a scan path or trace of head 8, for example, the scan path B on FIG. 2, and the beginning end of an adjacent track T, and this ½ track pitch phase difference is also corrected by deflection of bi-morph leaf 7 then a reproduced phase deviation of $\alpha/2$ occurs at the beginning of the scanning of track T. The foregoing results from the fact that a displacement of the head by one track pitch, as indicated by the arrow J on FIG. 2, corresponds to a phase deviation of $\alpha$. However, since the maximum displacement between a scan path of head 8 and the beginning end of an adjacent track T is ½ track pitch, the maximum phase deviation that can occur for this reason is $\pm\alpha/2$, that is, a maximum range of phase deviations of $\alpha$.

Figure 6:
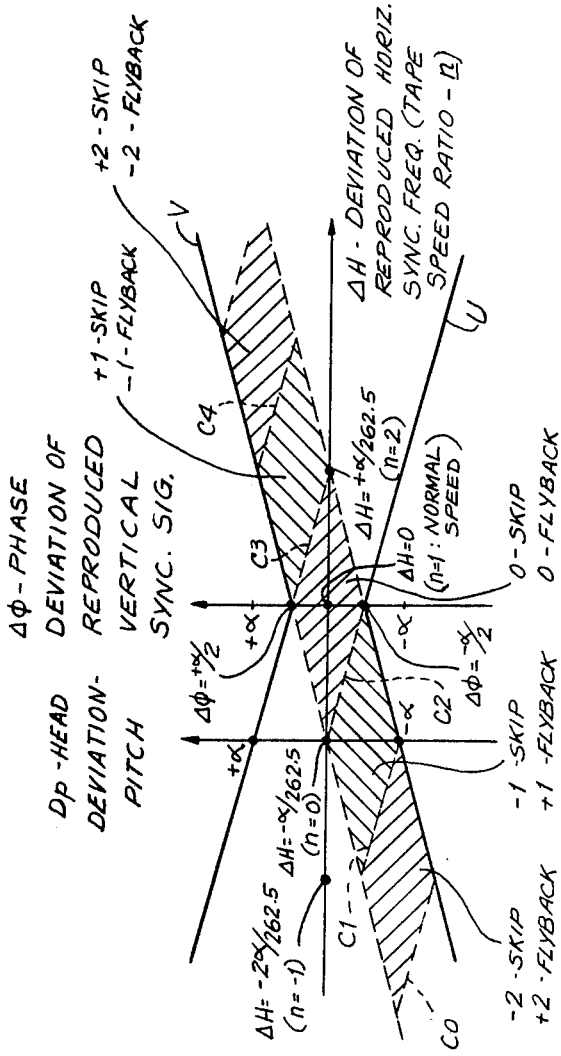
FIG. 6 is a graph showning shared regions each representing the necessary head flyback amplitude and track skip for various deviations of the frequency and phase of reproduced sync signals which are plotted as the abscissas and the ordinates, respectively.

Therefore, the maximum conceivable phase deviation might be $|n-1|\alpha+\alpha$, represented by the lines V and U on FIG. 6 and which is the sum of the phase deviation $|n-1|\alpha$, due to the deviation of the head from its neutral position in response to the inclination correction signal applied to bi-morph leaf 7 by reason of the tape speed ratio n, and the phase deviation $\alpha$ due to the deviation of the head from its neutral position for causing the beginning end of the scan path of head 8 to lie on a track T.

It will be appreciated from the foregoing that the coordinates $\Delta\Phi$ (phase deviation of reproduced vertical sync signal in respect to a reference vertical sync signal in terms of $\alpha$) and $\Delta H$ (deviation of the reproduced horizontal sync signal frequency in terms of $\alpha/262.5$) on the graph of FIG. 6 are respectively equivalent to $D_p$ (the deviation or displacement of the head from its neutral position at the concluding end of a track being scanned in terms of the pitch between adjacent tracks) and to n (the tape speed ratio).

The phase deviation of the reproduced vertical sync signal relative to the reference vertical sync signal cannot go outside the range defined between the lines U and V on FIG. 6. That is, $$\Delta\Phi_{max} = \pm\tfrac{1}{2}[|n-1|+1|]\alpha \qquad (10)$$

When $n<1$,
$$\Delta\Phi_{max} = \pm\tfrac{1}{2}\alpha\cdot n \qquad (11)$$

When $n>1$,
$$\Delta\Phi_{max} = \pm\tfrac{1}{2}\alpha\cdot n \pm \alpha \qquad (12).$$

When $n>1$, that is, in a fast-reproducing mode, and assuming that the phase deviation of the reproduced vertical sync signal relative to the reference vertical sync signal at the concluding end of a traced track is $\Delta\Phi$, whereupon a flyback (jump in the negative direction) of $(m-1)$ pitches is effected to select the next track to be traced with an inclination or slant correction of $(n-1)$ pitches, then the phase deviation $\Delta\Phi'$ at the conclusion of scanning of such next traced track can be determined as follows:

$$\Delta\Phi' = \Delta\Phi - (m-1)\alpha + (n-1)\alpha = \Delta\Phi + (n-m)\alpha \quad (13).$$

If $\Delta\Phi'$ determined from equation (13) is not over the limit or boundary or line V in FIG. 6, then the above assumed $(m-1)$ flyback or small jump is appropriate. However, if $\Delta\Phi'$ determined from equation (13) is over line V on FIG. 6, then a big jump or m flyback is necessary at the completion of the scanning of the first described tracks. In other words, it is necessary to effect the judgment $$\Delta\Phi' \leqq \Delta\Phi_{max} = \pm\tfrac{1}{2}\alpha n \quad (14).$$

When $$\Delta\Phi < -\tfrac{1}{2}\alpha n + m\alpha \quad (15a)$$

then a small jump or $(m-1)$ flyback is effected, and, when $$\Delta\Phi > -\tfrac{1}{2}\alpha n + m\alpha \quad (15b)$$

then a big jump or m-flyback is performed.

Furthermore, when $n < 1$, that is, in the slow, still or reverse reproducing mode, the phase deviation $\Delta\Phi'$ that can result after performing an m-pitch flyback (assuming this is to be a positive-direction jump and that $|m| < |m-1|$ to select the next track to be traced or scanned, and then scanning such next track with a suitable slant or inclination correction of the scanning path is:

$$\Delta\Phi' = \Delta\Phi - m\alpha + (n-1)\alpha \quad (16).$$

If $\Delta\Phi'$ determined from equation (16) is not below the lower boundary or limit line U, then the m-flyback is appropriate. On the other hand, if $\Delta\Phi'$ determined from equation (16) is below line U, then an $(m-1)$ flyback is required. In other words, when $n < 1$, that is, in the slow, still, or reverse reproducing modes, it is necessary to perform this judgment:

$$\Delta\Phi' \leqq \Delta\Phi_{max} = \tfrac{1}{2}\alpha n - \alpha \quad (17).$$

The results of such judgment are the same as have been indicated above in the inequalities (15a) and (15b). Consequently, the dotted straight lines $C_0$, $C_1$, $C_2$, $C_3$, $C_4$, ..., on FIG. 6 are according to the equation:

$$\Delta\Phi = -\tfrac{1}{2}n\alpha + m\alpha \quad (18)$$

and represent the boundary lines for determining the jump conditions.

For example, in the 2.25/1-fast playback mode, if the phase deviation $\Delta\Phi$ of the reproduced vertical sync signal is over the line $C_4$, as at the point $P_1$ on FIG. 5, a $-2$-flyback is effected to skip two tracks, for example, to skip the tracks $T_2$ and $T_3$ on FIG. 4, and to initiate the next trace or scan at the beginning end of the track $T_4$. If the phase deviation $\Delta\Phi$ is not over boundary line $C_4$ at the completion of the scanning of a track, for example, as at any one of the points $P_2$, $P_3$ or $P_4$ on FIG. 5, then a $-1$-flyback is effected to skip one track, for example, to skip from track $T_4$ to track $T_6$, from track $T_6$ to track $T_8$, or from track $T_8$ to track $T_{10}$, as shown on FIGS. 4 and 5.

Referring further to FIG. 6, it will be seen that the unlined regions thereof, that is, the regions without cross-hatching, are at a distance of $(n-1)\alpha$ from the boundary line V or U so that, even if the phase deviation $\Delta\Phi$ at the beginning of a track is within one of those unlined regions, the phase deviation $\Delta\Phi$ at the concluding end of the track will always appear in one of the cross-hatched regions on FIG. 6.

Further with reference to FIG. 6, it will be seen that the two scales applied to the abscissa are equivalent as follows:

$n = +2$ is equivalent to $\Delta H = +\alpha/262.5$
$n = +1$ is equivalent to $\Delta H = 0$
$n = 0$ is equivalent to $\Delta H = -\alpha/262.5$
$n = -1$ is equivalent to $\Delta H = 2\alpha/262.5$.

With reference to the two scales applied to the ordinates of FIG. 6, it will be seen that $\Delta\Phi = 60$ (that is 2.5H) is equivalent to $D_p = $ one track pitch.

Although it is possible to effect the jump judgments according to the $\Delta H - \Delta\Phi$ coordinates shown on FIG. 6 by means of a plurality of level comparators corresponding to the lines $C_0$, $C_1$, $C_2$ ..., respectively, such procedure would require the measurement of $\Delta H$ and $\Delta\Phi$ as analog values, respectively, with the result that measurement errors would be likely to occur. On the other hand, if it is attemped to effect the jump judgments according to the coordinates $\Delta H - \Delta\Phi$ of FIG. 6 by means of digital circuits, the amount of data or information to be processed becomes extremely large, so that digital processing is simply not practical. In this connection, adequate resolution for effecting the necessary judgments would likely require that the phase deviation or $\Delta\Phi$ data and the frequency deviation or $\Delta H$ data each be expressed by 8 binary bits. In order to obtain 7 kinds of track skip information, that is, $-3$, $-3$, $-1$, 0, $+1$, $+2$, and $+3$ track skip information by using ROM and the like, from the above information, for each kind of track skip it is necessary to provide:

8 bits + 8 bits = 16 bits address = 64 K data.

Therefore, it is necessary to provide an ROM capable of processing 448,000 bits of data ($7 \times 64,000$) to obtain the parallel output of 7 kinds of track skip information.

In order to avoid the foregoing complexity of digital processing, in accordance with this invention, the 2-dimensional data expressed by the $\Delta H - \Delta\Phi$ coordinates on FIG. 6 is converted to 1-dimensional data from which it is possible to digitally obtain extremely simple and accurate jump control.

Figure 7:
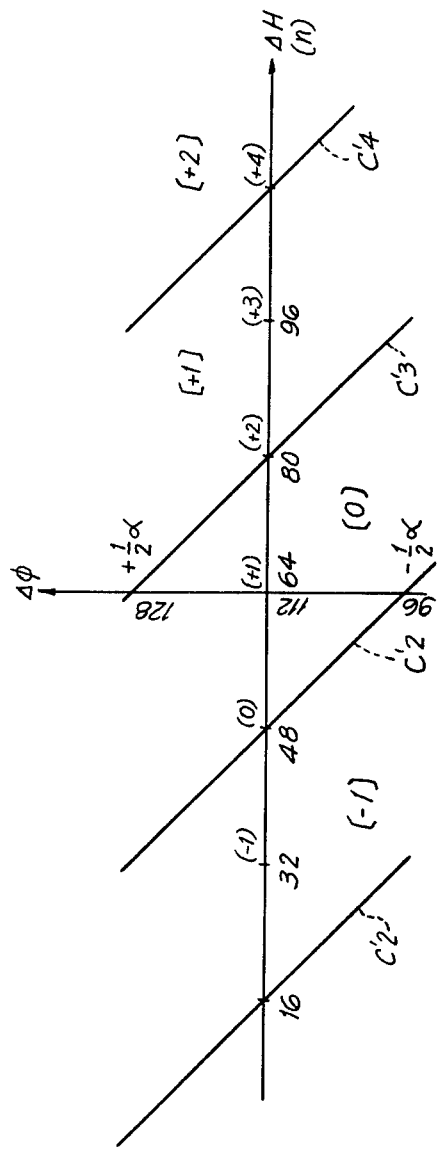
FIG. 7 is a graph showing amplified conditions for jump control according to this invention.

Referring now to FIG. 7 in which concrete numerical values are shown for the $\Delta H - \Delta\Phi$ coordinates of FIG. 6, it will be seen that the scale for $\Delta H$ is selected so that $\Delta H$ will undergo a numerical change of 16 for each numerical change of 1 in the tape speed ratio n, and the scale of $\Delta\Phi$ is selected so that a numerical change of 32 in the value of $\Delta\Phi$ will correspond to the unit $\alpha$. In other words, the scales of $\Delta H$ or n and of $\Delta\Phi$ are selected on FIG. 7 so that the number (32) representing a unit change ($\alpha$) in the phase deviation $\Delta\Phi$ of the reproduced vertical sync signal is double the number (16) representing a unit change in the tape speed ratio n. By reason of the foregoing selection of the scales on FIG. 7, the boundary lines provided between the cross-hatched regions of FIG. 6 for determining the jump conditions are converted, on FIG. 7, into respective straight lines $C'_1$, $C'_2$, $C'_3$, $C'_4$, ..., extending at 45° in respect to the coordinates.

Further, the integer-time-speed points of $\Delta H$ ($n = -1$, 0, $+1$, $+2$, ...) and the $\tfrac{1}{2}\alpha$-integer-time-phase points of $\Delta\Phi$ (... $\tfrac{1}{2}\alpha$, 0, $+\tfrac{1}{2}\alpha$, ...) are selected to have numerical values (for example, 48, 64, 80, 96, 112, 128 ...) which, when expressed as binary numbers, result in a carry occurring at a position among the upper bits.

When the condition of the jump to be effected is judged on the basis of the $\Delta H - \Delta \Phi$ coordinates on FIG. 7, the information concerning $\Delta H$ and $\Delta \Phi$ can be summed, and code data representing each jump region classified only by its upper bits can be obtained therefrom, as hereinafter described in detail.

Figure 8:
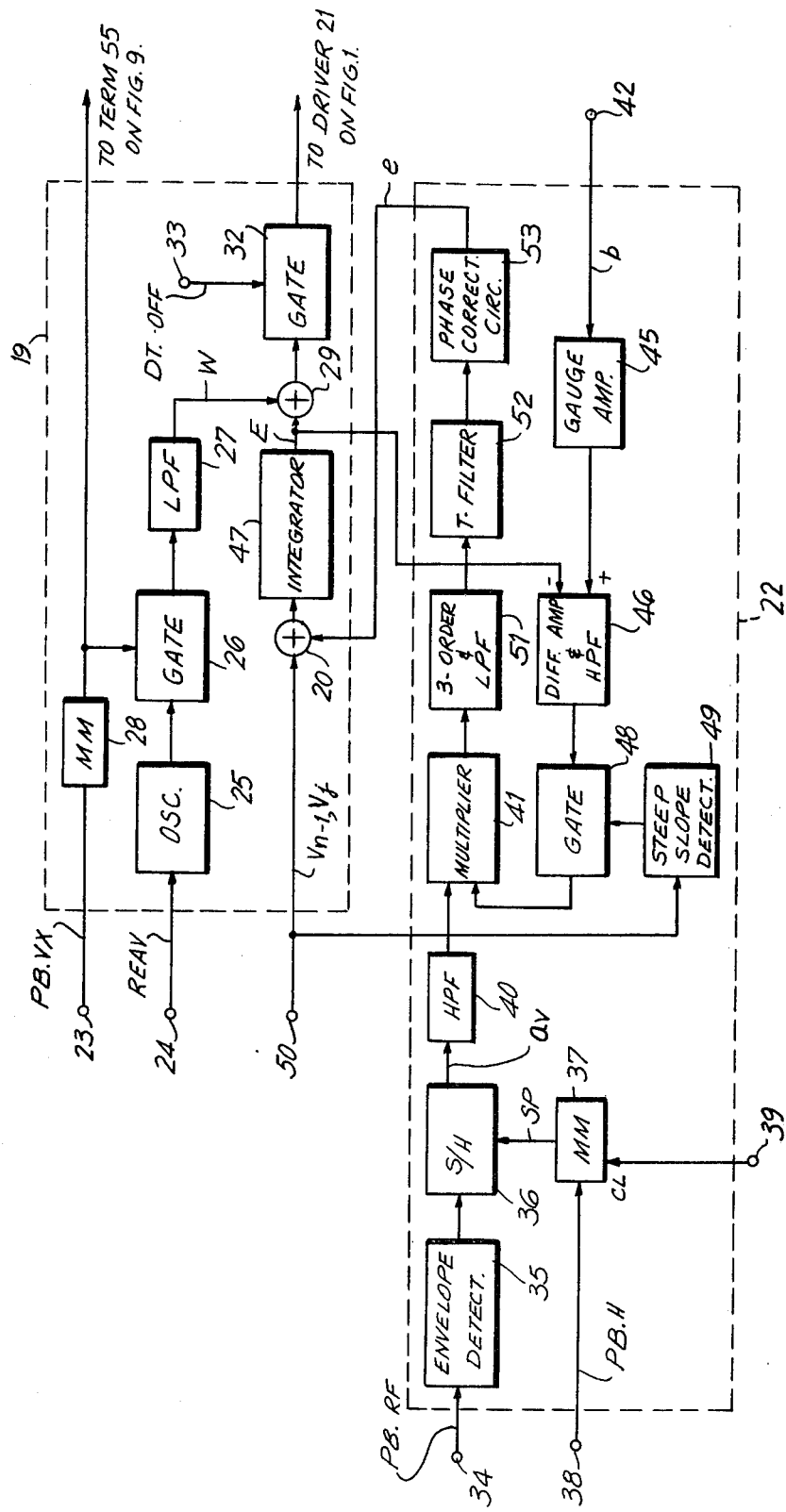
FIG. 8 is a block diagram of an integrating and wobbling circuit and a tracking error detecting circuit which are included in the tracking control system of FIG. 1.

Referring now to FIG. 8, it will be seen that an input terminal 23 of circuit 19 receives a reproduced vertical sync signal PB.VX, from sync processing circuit 17 of FIG. 1, and an input terminal 24 receives a reference sync signal REAV formed by servo system 9 of FIG. 1 from the external sync EX.SYNC and having its phase advanced relative to the latter by about 390 μs. Such reference sync signal REAV is applied to an oscillating circuit 25 which is desirably in the form of a PLL circuit for providing an oscillation or pulse signal at a frequency of 720 Hz ($12 \times 60$ Hz). The output of oscillating circuit 25 is applied through a gate 26 and a low-pass filter 27 to provide a corresponding sine wave for use as the wobbling or dithering signal W. The reproduced vertical sync signal PB.VX is applied from terminal 23 to a monostable multivibrator 28 which, in response thereto, generates an inhibit pulse having a 1.5 ms range around the vertical blanking period and by which gate 26 is closed during the head flyback period. Thus, the wobbling or dithering signal W is available from low pass filter 27 for application to one input of an adding or mixing circuit 29 only during each period when head 8 is tracing or scanning a record track. Further, the output of adding circuit 29 is supplied through a gate 32 to an output of integrating and wobbling circuit 19 connected to bi-morph drive circuit 21 (FIG. 1), and gate 32 is adapted to be closed by a mode signal DT.OFF supplied from sync processor 17 through a terminal 33 for rendering inoperative the dynamic tracking operation of the VTR so long as such mode signal is provided.

As further shown on FIG. 8, tracking error detecting circuit 22 has an input terminal 34 which receives the reproduced output PB.RF of head 8 from playback or reproducing amplifier 13 (FIG. 1) and applies the same to an envelope detector 35 having its detected output supplied to a sample and hold circuit 36. A monostable multivibrator 37 is triggered by the reproduced horizontal sync signal PB.H applied from sync separator 16 to an input terminal 38, whereby monostable multivibrator 37 provides a sample pulse SP of about 4.5 μs during each horizontal sync period. The operation of monostable multivibrator 37 is halted by a clear pulse CL suitably supplied thereto through a terminal 39 during the vertical blanking period which corresponds to the jump period. Thus, during the scanning of a record track by head 8, circuit 36 samples the output of envelope detector 35 at each horizontal synchronizing signal and holds the sampled value until the receipt of the next sampling pulse SP from monostable multivibrator 37. The amplitude or value $a_v$ sampled by circuit 36 is supplied through a high pass filter 40 to one input of a multiplier 41 which, at its other input, receives a signal corresponding to the output of strain gauge 11. More particularly, the output of strain gauge 11 on bi-morph leaf 7 constitutes a displacement detecting signal b which accurately reflects the actual deflections or displacements of bi-morph leaf 7 and which is applied to an input terminal 42 of circuit 22 (FIG. 8) for transmission therefrom through a gauge amplifier 45 to a (+) input of a differential amplifier and high-pass filter (HPF) 46. The jump signal $V_j$ and the inclination or slant error signal $V_{n-1}$ are applied from trace control circuit 18 through a terminal 50 to one input of adder 20 which has its output connected to an integrator 47 in circuit 19 by which such output is modified into a track tracing signal E to be added to wobbling or dithering signal W in adder 29. The track tracing signal E is further supplied from integrator 47 to the ($-$) input of differential amplifier and HPF 46 by which the track tracing signal E, which includes the jump signal $V_j$, the inclination correction signal $V_{n-1}$ and the tracking error signal e, are subtracted from the displacement detecting signal b to extract therefrom only the wobbling or dithering component of such signal b. The wobbling component derived from the output of circuit 46 is supplied through a gate 48 to multiplier 41. It will be appreciated that, during the head jump period, the jump signal $V_j$ included in the signal applied to terminal 50 changes drastically, and a steep slope detector 49 detects such drastic change of the jump signal $V_j$ and provides a corresponding signal to gate 48 for closing the latter. Thus, during the head jump period, at which time the head 8 is not scanning a track and, therefore, tracking error information is not being obtained, gate 48 is closed to prevent the application of the wobbling component of signal b from strain gauge 11 to multiplier 41.

On the other hand, during the scanning of a track by head 8, the wobbling component of signal b is applied through gate 48 to multiplier 41 and there multiplied with the sampled output $a_v$ of envelope detector 35 for obtaining a tracking error signal e as the resulting output which is supplied through successive filters 51 and 52 and a phase correction circuit 53 to adder 20 for mixing in the latter with the jump signal $V_j$ and the slant or inclination correction signal $V_{n-1}$ from terminal 50. Filter 51 is desirably a 3-order low-pass filter provided for eliminating the second harmonics of the wobbling or dithering frequency (720 Hz) and of the resonance frequency $f_o$ of the bi-morph leaf 7, respectively, which harmonics are generated in multiplier 41. The second filter 52 is desirably a twin-T-filter or feed-back tube filter having a notch and loop gain of 795 Hz and 16 dB, respectively, for eliminating a frequency component near the wobbling frequency. Finally, phase correction circuit 53 is provided to improve the response characteristics of the tracking servo loop formed by feeding back tracking error signal e to bi-morph leaf 7.

As earlier noted, the integrator 47 integrates the output of adder 20 ($V_{n-1} + V_j + e$) to form the track tracing signal E, for example, as shown in FIG. 5. Such track tracing signal E is, as described above, added to wobbling signal W in adder 29, whereupon the output of adder 29 is supplied through gate 32 and driver 21 as the signal B applied to bi-morph leaf 7 (FIG. 1).

Figure 9:
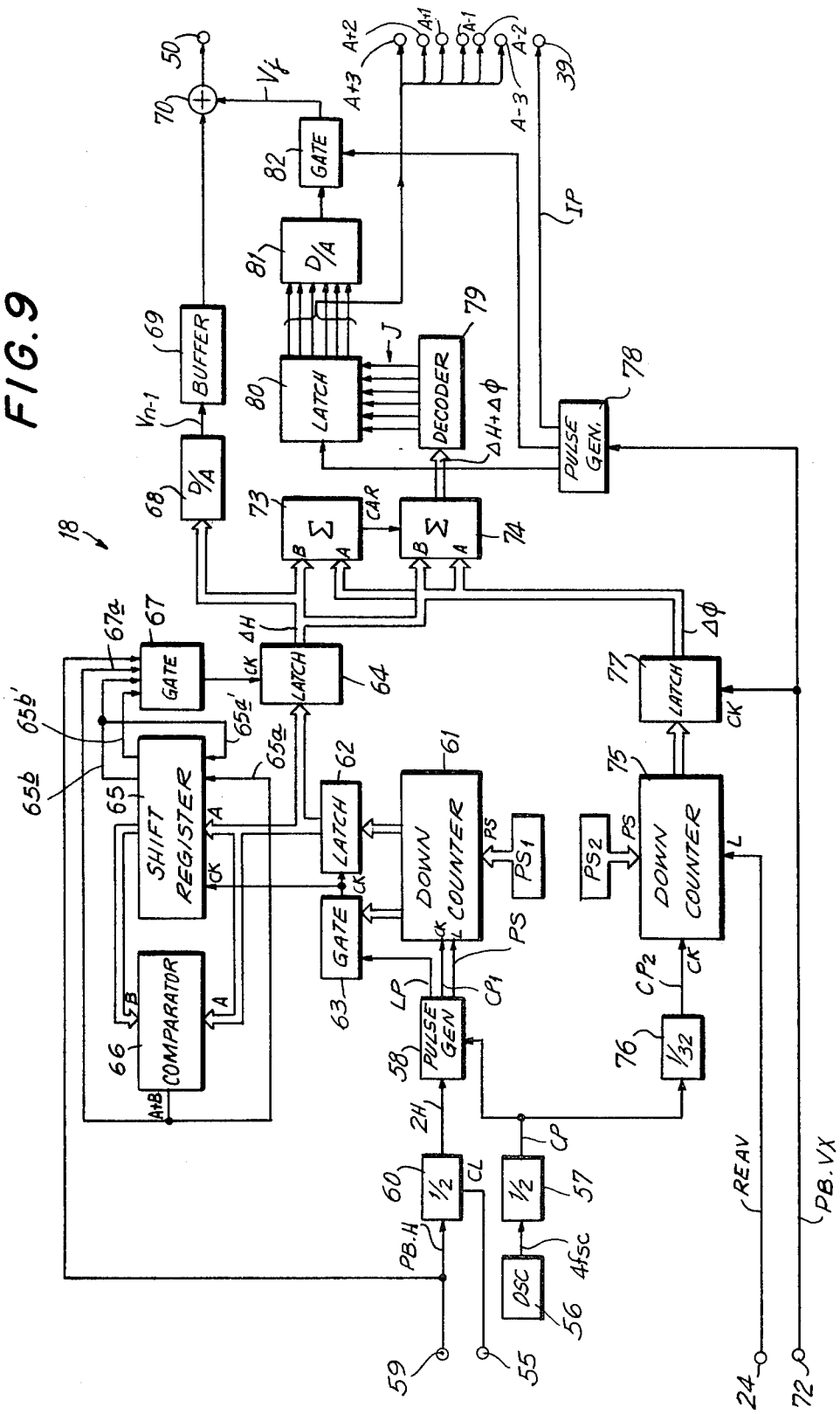
FIG. 9 is a block diagram of a trace control circuit which is also included in the tracking control system of FIG. 1.

Referring now to FIG. 9, it will be seen that trace control circuit 18 may include a reference oscillator 56 which generates a reference signal of 4 $f_{sc}$ (14.31818 MHz in the case of an NTSC video signal) which is divided by two in divider 57 to provide a clock pulse CP (FIG. 10A) of a frequency equal to 2 $f_{sc}$ (7.15909 MHz) which is supplied to a pulse generator 58. The reproduced horizontal sync signal PB.H from sync separator 16 in FIG. 1 is further supplied through a terminal 59 (FIG. 9) to a frequency divider 60 which provides a 2H-duration pulse representing a 2H period which is applied to pulse generator 58. The output of monostable-multivibrator 28 (FIG. 8) is further supplied through a terminal 55 (FIG. 9) as a clearing signal CL for divider 60 so that the latter does not operate during each vertical blanking period.

In response to the clock pulse CP (FIG. 10A) from divider 57 and the 2H-duration pulse (FIG. 10B) from divider 60, pulse generator 58 is operative to provide a measured pulse CP 1 (FIG. 10C), a latch pulse LP (FIG. 10D) and a presetting pulse PS (FIG. 10E).

The measured pulse $CP_1$ (FIG. 10C) is a pulse signal synchronized with the input clock pulse CP (FIG. 10A) and which is produced by pulse generator 58 commencing at a time which is delayed by two clock periods following the rising of the 2H-duration pulse (FIG. 10B). This measured pulse $CP_1$ is supplied to a clock input CK of a down-counter 61 which is operative to count the number of pulses $CP_1$ during the 2H period of the reproduced horizontal sync signal after counter 61 has been preset to a predetermined number by preset pulse PS (FIG. 10E) supplied to a load input L of counter 61 from pulse generator 58 following the rising of the 2H-duration pulse (FIG. 10B). The delay in the issuing of measured clock pulse $CP_1$ from pulse generator 58 following the rising of the 2H-duration pulse (FIG. 10B) provides the time necessary for the presetting of counter 61 to its preset value $PS_1$ which is, for example, 940. In such case, the rest or final counted number of counter 61 after counting the measured pulse $CP_1$ during a 2H period is 32 (center value) for the normal reproducing mode. Of course, the rest or counted value of counter 61 increases or decreases relative to the value 32 for non-normal reproducing modes of the VTR. Since the frequency of the clock pulses CP, and hence of the measured pulses $CP_1$, is 7.159 MHz, the number of measured pulses $CP_1$ occurring in a 2H period is 910. However, since there is a loss of two of the measured pulses $CP_1$ at the beginning of the 2H period due to the two-pulse delay in the generation of the measured pulses $CP_1$ by pulse generator 58 (FIG. 10C), the number of measured pulses $CP_1$ actually counted by down-counter 61 is 908 and, therefore, counter 61 counts down from the preset number or value of 940 to the rest or center value 32.

In a non-nominal reproducing mode, for example, the 2/1 fast-forward reproducing mode, that is, when the reproducing tape speed is two times the normal tape speed, the relative scanning speed of head 8 is increased and the number of reproduced horizontal sync signals occurring during one field is increased by $\alpha = 2.5H$. Therefore, the frequency of the reproduced horizontal sync signal PB.H is increased and the duration of the 2H period is reduced so that, as a consequence thereof, the number of measured pulses $CP_1$ occurring during the 2H period is decreased. Therefore, the count value of counter 61, at the completion of the 2H period, is increased, for example, as follows:

$$940 - 908 \times \frac{262.5}{262.5 + 2.5} = 40.5$$

A latch circuit 62 receives the output (6 bits) of counter 61, and has a trigger input CK for receiving latch pulse LP (FIG. 10D) from pulse generator 58 through a gate circuit 63. Normally, latch 62 is made operative to latch a previous count value of counter 61 at the rising edge of the 2H-duration pulse (FIG. 10B). However, the upper 4 bits of the count value of counter 61 are also applied to gate circuit 63 so that, when counter 61 overflows or is beyond the normal dynamic range of 6 bits (1-32-64), gate circuit 63 is closed thereby to prevent the application of latch pulse LP to latch circuit 62 with the result that the latter cannot latch abnormal data. As a result of the foregoing, only count data corresponding to a reproduced horizontal sync frequency deviation within a predetermined range of, for example, about ±3.4%, is supplied through latch circuit 62 to the subsequent processing circuits of trace control circuit 18.

Such subsequent or further processing circuits are shown to include a latch circuit 64 adapted to receive a latch pulse at its trigger input CK from a data check circuit comprised of a shift register (SR) 65, a comparator 66 and a gate circuit 67. More particularly, the upper 4 bits of the 6 bits output of latch circuit 62 are supplied to shift register 65 and comparator 66 as an A-input thereto. The output of gate 63, that is, latch pulse LP (FIG. 10D) from pulse generator 58, is applied to input CK of SR 65 as the shift pulse for the latter, whereby the output B of SR 65 represents the count value of counter 61 which was counted one block period or 2H ago, while the input A to SR 65 represents the new count value of counter 61. The comparator 66 compares the input A and output B of SR 65 and provides a high level output or "1" when A=B.

The A=B output signal from comparator 66 is supplied directly to an input 67a of gate circuit 67, and also to a 1-bit input 65a of SR 65 having a corresponding 1-bit output 65b at which a once-delayed A=B signal is obtained so as to be delayed by one block period (that is, delayed by 2H) in respect to the A=B output from comparator 66. Such once delayed output 65b from SR 65 is supplied as an input to gate circuit 67 and also to another 1-bit input 65a' of shift register 65 having still another 1-bit output 65b' at which there is obtained a twice delayed A=B signal supplied to gate circuit 67 and being delayed by 2-block periods (4H) in respect to the A=B output from comparator 66. Gate circuit 67 still further receives the reproduced horizontal sync signal PB.H from terminal 59 and is operative, in response thereto, to provide a latch pulse for latch circuit 64 only when the output A=B from comparator 66, and the once and twice delayed outputs 65b and 65b' from SR 65 are also all simultaneously at a high level. In other words, the data applied to the input of latch circuit 64 is transferred to the output thereof only when the count value to which counter 61 counts during four successive 2H-periods (that is, the present count value, the count value 1-block period (2H) ago, the count value 2-block periods ago, and the count value 3-block periods ago) are all equal. When A≠B is detected by comparator 66, gate 67 is closed to inhibit the operation of latch 64 for the next 3-block periods on the assumption that the count data during the three successive block periods are also erroneous. The correct count data obtained from down counter 61 before the detection of an inequality by comparator 66 is stored in latch circuit 64 so long as the operation of the latter for transferring data is inhibited, and such stored count data continues to be processed in the later components of trace control circuit 18.

It will be appreciated that, in the above-described check circuit, the carry of the lowest of the upper 4 bits of the output of latch 62, for example, the change of such output from XXX011 to XXX100, corresponds to a very small deviation of the reproduced horizontal sync frequency equivalent to about ½ the pulse-width of measured clock pulse CP1. Thus, if comparator 66 is made to respond to any inequality, no matter how small, between the input A and output B of shift register 65, it is possible that substantially normal data may be judged to be erroneous by comparator 66. However, even in that case, the operation of the trace control circuit 18 will not become unstable, as gate circuit 67 will ensure that latch circuit 64 will change its output only when the value to which counter 61 has counted down has been stabilized at a changed value for at least three previous block periods. Furthermore, if desired, comparator 66 can be made to detect deviations from approximate equality of the signals A and B rather than the precise equality thereof.

From the output of latch circuit 64 is obtained the data (6 bits) corresponding to the deviation $\Delta\Phi$ of the frequency of the reproduced horizontal sync signal PB.H in respect to the reference frequency. FIG. 11 shows the relationship between the frequency deviation $\Delta H$ of the reproduced horizontal sync signal PB.H and the reproducing tape speed ratio n, with $\Delta H$ being shown to be proportional to n. There is also shown along the abscissa in FIG. 11, the real count numbers, that is, the numbers of measured pulses $CP_1$, counted by down-counter 61 for each of the reproducing tape speed ratios n, while the value of $\Delta H$ is shown, on the ordinate, in terms of the value or number to which counter 61 counts down at the completion of a 2H period for each of the reproducing tape speed ratios n.

Returning to FIG. 9, it will be seen that the output $\Delta H$ of latch circuit 64 is supplied to a D/A converter 68 which provides a corresponding voltage signal $V_{n-1}$, that is, an inclination or slope correction signal corresponding to the deviation (n−1) from the normal tape speed. For example, in the 2/1 fast-forward reproducing mode, $\Delta H$ from latch circuit 64 is equal to 40.5, as indicated above and as shown on FIG. 11, and, in response to such value of $\Delta H$ from latch circuit 64, D/A converter 68 provides a slant or inclination correction voltage equivalent to one track pitch (n−1) which is converted to the current shown on the i-axis of FIG. 11. More particularly, as shown on the current or i-axis of FIG. 11, during operation of the VTR in its normal reproducing mode (n=+1), the center value 32 to which counter 61 counts down causes the corresponding output of D/A 68 to provide a current of $0\mu A$. The output of D/A 68 is supplied through a buffer 69 to one input of an adder 70 which, at another input, receives the jump signal $V_j$ produced as hereinafter described in detail. The resulting output $V_j+V_{n-1}$ from adder 70 is applied through output terminal 50 and adder 20 to integrator 47 shown on FIG. 8 and which integrates the output of buffer 69 to form the slope voltage waveform shown on FIG. 5. In response to such slope voltage waveform, bi-morph leaf 7 is deflected to correct the angular difference or inclination error between the record track T and the scanning path of head 8.

Referring again to FIG. 9, it will be seen that certain bits of the horizontal frequency deviation data $\Delta H$ at the output of latch circuit 64 are supplied to respective inputs B of adders 73 and 74, while A inputs of adders 73 and 74 are supplied with respective bits of phase deviation $\Delta\Phi$ which indicate deviations of the phase of the reproduced vertical sync signal relative to a reference vertical sync signal, as hereinafter described in detail. For obtaining the phase deviation data $\Delta\Phi$, trace control circuit 18 is shown to further include a down counter 75 having a clock input CK to which there is supplied a measured clock pulse $CP_2$ (223.72 KHz) obtained by supplying the clock pulse CP (2 $f_{sc}$−455 pulses/1H) from divider 57 to a frequency divider 76 where the clock pulse CP is further divided by 32. Thus, the number of measured pulses $CP_2$ counted by counter 75 in each horizontal period H is $455 \times 1/32 = 14.22$ pulses/H, and the phase change $\alpha = 2.5H$ caused by one track pitch movement of the tape corresponds to 35.5 pulses/track pitch. The counter 75 is a down-counter, as previously noted, which is preset to the value $PS_2 = 190$ in response to the application to its load input L of the reference sync signal REAV from terminal 24, and the phase of which is advanced by about 390 $\mu s$ relative to the external sync signal EX.SYNC. After such presetting, counter 75 counts down the measured clock pulse $CP_2$ and the output of counter 75 is supplied to a latch circuit 77 which latches the output of counter 75 in response to the application to latch circuit 77 of the reproduced vertical sync signal PB.VX from sync processing circuit 17 through terminal 72. Therefore, latch circuit 77 sequentially stores, for each vertical period, the count data, that is, the value to which counter 75 counts down, in correspondence to the phase difference $\Delta\Phi$ between the reference sync signal REAV and the reproduced vertical sync signal PB.VX. The preset value $PS_2$ of counter 75 is determined so that the data $\Delta\Phi$ will be 112, that is, $(2^6+2^5+2^4)$, when the phase of the reference sync signal REAV and the phase of the reproduced vertical sync signal PB.VX are the same. The operational range of counter 75 is 8 bits, and bits of the output $\Delta\Phi$ of latch circuit 77 are applied to respective A inputs of adders 73 and 74, as hereinafter described in detail. The adders 73 and 74 are 4-bit adders, respectively, and each generally produces the sum $A+B=\Sigma$ and a carry output.

Figure 12:
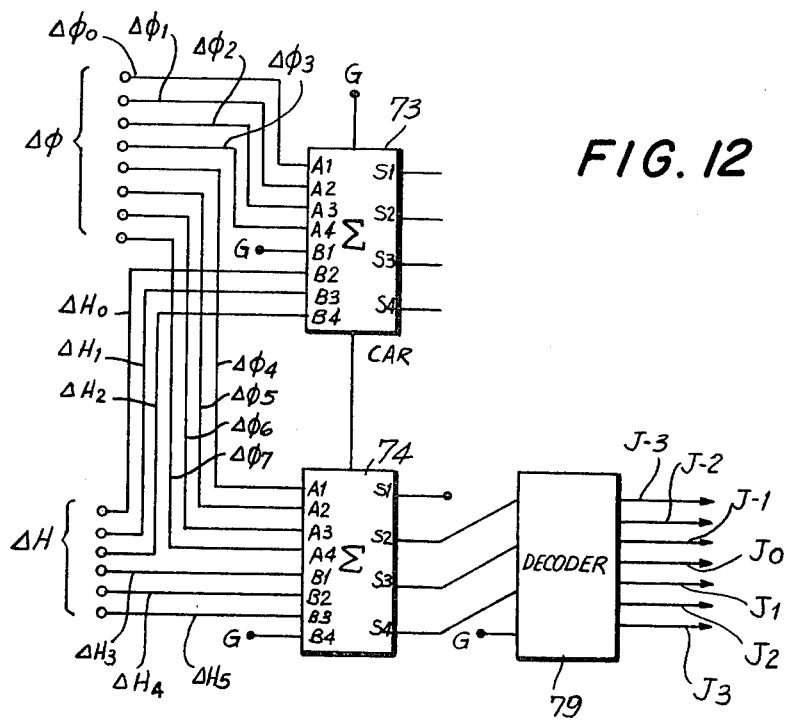
FIG. 12 is a circuit diagram showing details of adders and a decoder included in circuit of FIG. 9.

More particularly, as shown on FIG. 12, the lower 3 bits ($\Delta H_0$, $\Delta H_1$, and $\Delta H_2$) of the frequency deviation data $\Delta H$ from latch circuit 64 are supplied to the upper 3 bits $B_2$, $B_3$ and $B_4$, respectively, of the B input of adder 73. The least significant bits $B_1$ of the B inputs of adder 73 is connected to ground, that is, G=0, so that the addition of $\Delta H$ and $\Delta\Phi$ will be performed with $\Delta H$ being doubled or multiplied by 2. In other words, the center value 32 of $\Delta H$ corresponding to the normal tape or reproducing mode (n=+1) is changed to 64, as indicated on FIG. 7. The remaining or upper bits $\Delta H_3$, $\Delta H_4$ and $\Delta H_5$ of $\Delta H$ are supplied to the B inputs $B_1$, $B_2$ and $B_3$, respectively, of adder 74 and the most significant bit $B_4$ of adder 74 is connected to ground, that is, G=0, to indicate "no data". On the other hand, the lower 4 bits $\Delta\Phi_0$, $\Delta\Phi_1$, $\Delta\Phi_2$ and $\Delta\Phi_3$ of the 8-bit phase difference or deviation data $\Delta\Phi$ are applied to the A inputs $A_1$, $A_2$, $A_3$ and $A_4$, respectively, of adder 73, while the upper 4 bits $\Delta\Phi_4$, $\Delta\Phi_5$, $\Delta\Phi_6$ and $\Delta\Phi_7$ are applied to A inputs $A_1$, $A_2$, $A_3$ and $A_4$, respectively, of adder 74.

In adder 73, the lower bits of the data $\Delta H$ and the lower bits of the data $\Delta\Phi$ are added and the resulting carry output CAR is applied to the carry input of adder 74. In adder 74, the upper bits of the data $\Delta H$, and the upper bits of the data $\Delta\Phi$, and also the carry output CAR from adder 73 are added. Consequently, the 6-bit frequency deviation data $\Delta H$ and the 8-bit phase deviation data $\Delta\Phi$ are added with their scales having the predetermined relation shown by the $\Delta H$ and $\Delta\Phi$ coordinates on FIG. 7. Adder 74 has outputs $S_1$, $S_2$, $S_3$ and $S_4$ at which are obtained the upper 4 bits of the addition result. The upper 3 bits $S_2$, $S_3$ and $S_4$ of the addition result are supplied to a decoder 79 which is operative to provide therefrom 7 different kinds of jump instruction signals $J_{-3}$, $J_{-2}$, $J_{-1}$, $J_0$, $J_1$, $J_2$ and $J_3$.

The characteristics of the 3-bit addition data obtained from adder 74 will now be explained with reference to FIG. 13 in which the $\Delta H$ - $\Delta \Phi$ coordinates shown on FIG. 7 are expanded to x-y coordinates. As described above, the point of origin of the $\Delta H$ - $\Delta \Phi$ coordinates (that is, n=1 and $\Delta \Phi = 0$) is selected to correspond to 64 and 112 on the x-y coordinates, respectively. With such selection of the origin of the $\Delta H$ - $\Delta \Phi$ coordinates relative to the x-y coordinates, some of the boundary lines dividing the jump regions, for example, the boundary lines $C'_3$ and $C'_2$ can be expressed with reference to the x-y coordinates, as follows:

For the boundary line $C'_3$ $$y = -x + 192 \qquad (19a)$$

or $$y = x = 192 \qquad (19b)$$

For the boundary line $C'_2$ $$y = -x + 160 \qquad (20a)$$

or $$y + x = 160 \qquad (20b).$$

From the foregoing, it is apparent that the sum of the data $\Delta H$ and $\Delta \Phi$ at any point on the boundary line $C'_3$ is always 192, and that the sum of the data $\Delta H$ and $\Delta \Phi$ at any point on the boundary line $C'_2$ is always 160. Consequently, in the region between the boundary lines $C'_2$ and $C'_3$, the sum data satisfies the following:

$$160 < \Delta H + \Delta \Phi < 192 \qquad (21)$$

The binary expressions for the numbers 192 and 160 are as follows:

$$192 = 110 | 0000$$

$$160 = 101 | 0000$$

Figure 13:
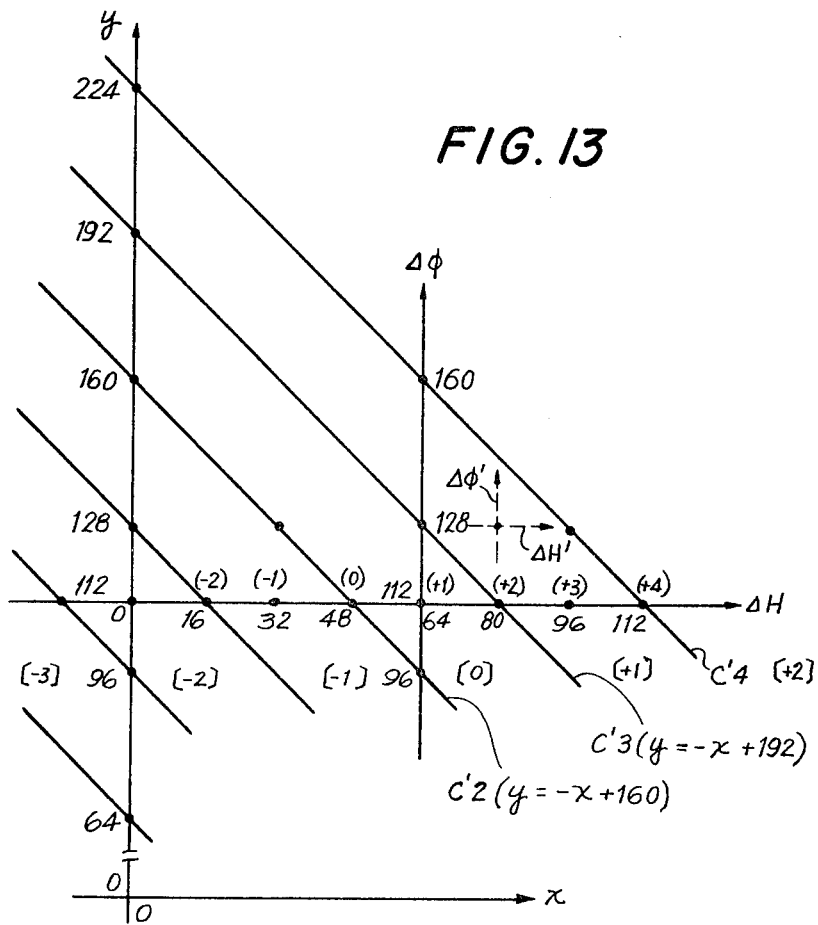
FIG. 13 is a graph showing a desirable transposition of the conditions for jump control from the frequency and phase deviation coordinates of FIG. 7 to x-y coordinates which simplify the digital processing of the information required for such jump control.

Therefore, in the [0] skip region between the boundary lines $C'_2$ and $C'_3$ on FIGS. 7 and 13, the upper 3 bits of the sum of the data $\Delta H + \Delta \Phi$ are always (1,0,1) and only the lower 4 bits of the sum are changed. In other words, the [0] skip region between the boundary lines $C'_2$ and $C'_3$ can be represented by the code (1,0,1) of the upper bits of the respective sum data. Further, if the data of $\Delta H$ and $\Delta \Phi$ is beyond the boundary line $C'_3$ in the coordinates of FIG. 7, the sum of such data is greater than 192, that is, the [+1] skip region can be represented by the code (1,1,0) of the upper bits of the respective sum data. Therefore, each of the divided jump (skip) regions can be represented by the upper 3 bits $(2^7, 2^6, 2^5)$ of the sum of the data $\Delta H + \Delta \Phi$ in the coordinates of FIG. 7. By reason of the foregoing, in accordance with the present invention it is not necessary to provide a large number of analog comparators, as in the prior art, or a large capacity ROM for storing information as to the skip or jump conditions for every point in the coordinates. Rather, it is only necessary to store information as to the jump or skip conditions for a limited number of regions, each of which is identified by only the upper bits of the sum of the data $\Delta H + \Delta \Phi$ coming within the respective region. The sum data for each of the skip regions appearing on FIG. 13 are given below:

TABLE II

| Skip Region | Binary Expression ($2^7, 2^6, 2^5, ---$) | | Sum of the Data $\Delta H + \Delta \Phi$ |
|---|---|---|---|
| [−3] | 0 1 0 \| x x x x | ≧ | 64 |
| [−2] | 0 1 1 \| x x x x | ≧ | 96 |
| [−1] | 1 0 0 \| x x x x | ≧ | 128 |
| [0]  | 1 0 1 \| x x x x | ≧ | 160 |
| [+1] | 1 1 0 \| x x x x | ≧ | 192 |
| [+2] | 1 1 1 \| x x x x | ≧ | 224 |

Two conditions need to be satisfied in order to permit selection or determination of the jump condition by the sum data shown on Table II above. As a first condition, the scales of the $\Delta H$ axis and the $\Delta \Phi$ axis need to be selected so that the boundary lines between regions representing different jump or skip conditions will be constituted by straight lines at 45° to the coordinates. Thus, in the case where the data is to be processed in accordance with the divided regions shown on FIG. 6, the scales are selected so that, as shown on FIG. 7, the number (32) representing a unit change ($\alpha$) in the phase of the reproduced vertical sync signal, as indicated on the axis $\Delta \Phi$, for example, representing the difference between the number 96 for $-\frac{1}{2}\alpha$ and the number 128 for $+\frac{1}{2}\alpha$, is double the number (16) representing a unit change in the tape speed ratio n, for example, the difference between the number 64 for n=+1 and the number 80 for n=+2. As a second condition, when each boundary line represented by $\Delta H - \Delta \Phi$ coordinates determined by the foregoing first condition is expressed in x-y coordinates, for example, as in the preceding equations (19b) and (20b), the value at which each boundary line crosses the y-axis must be one which, in its binary expression, corresponds to the occurrence of a carry at an upper bit, for example, at the least significant bit of the upper 3 bits. According to this second condition, for example, if it is assumed that the center value of $\Delta H$ is 64 and the center value of $\Delta \Phi$ is 112, as in FIG. 13, then integer-time-speed points on the $\Delta H$ axis, for example, where n is equal to −2, −1, 0, +1, +2, --- are respectively equal to the values 16, 32, 48, 64, 80 ---, and integer-time-phase points on the $\Delta \Phi$ axis, such as, $-\frac{1}{2}\alpha$, 0, $+\frac{1}{2}\alpha$, $\alpha$, $+3/2\alpha$, --- are respectively equal to 96, 112, 128, 144, 160 ---.

Further, the numerical values of the integer-time-speed points and the integer-time-phase points depend on how the origin of the $\Delta H - \Delta \Phi$ scales is determined. For example, if $\Delta H' - \Delta \Phi'$ coordinates are employed so as to have their origin at (80,128), as indicated in broken lines of FIG. 13, then the scale of the $\Delta H'$ axis could be 32 (n=−2), 48 (n=−1), 64 (n=0), 80 (n=+1), 96 (n=+2), 112 (n=+3), ---, and the scale of the $\Delta \Phi'$ axis could be 96 ($-\alpha$), 112 ($-\frac{1}{2}\alpha$), 128 (0), 144 ($+\frac{1}{2}\alpha$), 160 ($+\alpha$), ---. In order to use the foregoing $\Delta H' - \Delta \Phi'$ coordinates, the preset values of down counters 61 and 75 would have to be changed accordingly. In this case, the upper 4 bits of the sum of the data $\Delta H' + \Delta \Phi'$ may be used as the dividing code for the several regions, and the [0] skip region may be identified by the binary expression (0,1,1,0) which corresponds to the [+1] region in Table II.

In order to increase the resolution with which the several regions are divided from each other, the input clock frequencies of the counters 61 and 75 on FIG. 9, that is, the frequencies of the measured pulses $CP_1$ and $CP_2$ may be increased, with the numerical values of the points on the y-axis at which the boundary lines $C'_1$, $C'_2$, $C'_3$, $C'_4$, $C'_5$, --- cross the same being selected to be, for example, 64, 128, 192, 256, 320, ---, and with the upper 3 bits of the sum of the data $\Delta H + \Delta \Phi$, that is, the bits ($2^8$, $2^7$, $2^6$), being used as a code for each region. In the foregoing case, the carry bit of adder 74 in FIG. 9 could be used as the ($2^8$) bit of the addition result.

The decoder 79 may be a binary-octal decoder which, in response to the 3-bit output $S_2$, $S_3$, $S_4$ from adder 74, is operative to provide the corresponding one of the jump signals $J_{-3}$, $J_{-2}$, $J_{-1}$, $J_0$, $J_{+1}$, $J_{+2}$, $J_{+3}$ characteristic of the several divided regions. Further, if it is established that the signal $J_0$ is "0" for representing the [0] skip region (no jump), and that the other output signals $J_{-3}$, $J_{-2}$, $J_{-1}$, $J_{+1}$, $J_{+2}$ and $J_{+3}$ are "1" for indicating the respective regions, it is possible to omit an output line for the signal $J_0$ and, therefore, there may be only six output lines extending from decoder 79, as indicated at J on FIG. 9.

As further shown on FIG. 9, the output J of decoder 79 is supplied to a latch circuit 80 to be latched for each reproduced field in response to a latch pulse formed by a pulse generator 78 on the basis of the reproduced vertical sync equivalent signal PB.VX transmitted through terminal 72 from sync processor 17. The output of latch circuit 80 is supplied to a D/A converter 81 for conversion in the latter to a respective analog current level. In response to any one of the jump signals $J_{+1}$, $J_{+2}$, $J_{+3}$, the output D/A converter 81 is a positive pulse corresponding, in its amplitude, to the respective amount of the jump to be effected. For the jump signals $J_{-1}$, $J_{-2}$, $J_{-3}$, the output of converter 81 is a negative pulse again corresponding, in its amplitude, to the amount of the jump to be effected. In response to the output of the D/A converter 81, for example, in correspondence to the decoder output $J_{+2}$ at the completion of the scanning of the track $T_1$ on FIG. 4, a 1-pitch jump (−2 flyback) occurs in the direction which is the reverse of the direction of tape movement, so that 2-track-skip reproduction is effected, that is, two tracks $T_2$ and $T_3$ are skipped, and reproduction continues at the beginning of the track $T_4$.

The output of D/A converter 81 is supplied through a gate circuit 82 to adder 70 as the jump signal $V_j$ which is to be added to the inclination or slant error correction signal $V_{n-1}$ provided at the output of buffer 69, whereupon the adder or combined signal $V_{n-1} + V_j$ is supplied from the ouput of adder 70 through terminal 50 to the adder 20 in FIG. 8. The gate circuit 82 is opened during the vertical blanking or jump period in response to a suitable timed output from pulse generator 78.

Pulse generator 78 further provides an inhibit pulse IP during the vertical blanking or jump period, and such pulse IP is applied through terminal 39 to the clear input CL of monostable multivibrator 37 in FIG. 8. Consequently, during the jump period, at which time head 8 is not scanning or tracing a record track on tape 1, the operation of sample-hold circuit 36 is interrupted to avoid any attempt to extract an RF envelope signal.

The jump signals $J_{+3}$, $J_{+2}$, $J_{+1}$, $J_{-1}$, $J_{-2}$, $J_{-3}$ selectively applied from the output of latch circuit 80 to D/A converter 81 in FIG. 9 are also selectively applied from latch circuit 80 through respective terminals $A_{+3}$, $A_{+2}$, $A_{+1}$, $A_{-1}$, $A_{-2}$, $A_{-3}$ to sync processor 17 in FIG. 1 so that the latter may form the reproduced vertical sync equivalent signal PB.VX on the basis of the selected jump signal and the reproduced sync signal PB.SYNC obtained from sync separator 16. Such equivalent signal PB.VX is very well protected against sudden dropouts and the like. More particularly, the sync processor 17 may count an automatic frequency controlled reproduced horizontal sync signal AFC.H generated in time base corrector 15, and which is extremely stable. On the basis of the counting of such AFC.H signal in processor 17, a position pulse is generated which is 262.5 H from the reproduced vertical sync signal PB.V. Such position pulse is then used as a gate pulse for extracting the reproduced vertical sync signal PB.V as the equivalent signal PB.VX. Therefore, if, at any time, the reproduced vertical sync signal PB.V is missing, a pulse based on the previously mentioned position pulse is substituted therefor. Moreover, any pitch interruption in the position pulse generated in processor 17 by counting the signal AFC.H is corrected by the jump signal obtained from latch circuit 80 in FIG. 9.

Further, in sync processor 17, a picture phase representing sync signal TBC.V to be used in time base corrector 15 may be generated on the basis of the reproduced vertical sync equivalent signal PB.VX, and the jump in the phase of the latter, which occurs upon each track jump, is corrected in response to the selected one of the jump signals applied to sync processor 17. Thus, the sync signal TBC.V can always represent a predetermined position in the reproduced picture.

In the case of FIG. 6, equation (18) above for defining the boundary lines $C_0$, $C_1$, $C_2$, $C_3$, $C_4$, —assumes that $\Delta \Phi$ represents the phase deviation of the reproduced vertical sync signal PB.V recorded in each track T at the concluding end thereof (FIG. 2) in respect to a corresponding reference sync signal. However, the phase deviation or shift $\Delta \Phi$ may be detected in respect to a reproduced sync signal recorded in each track at some other position d% from the beginning of the track relative to a reference sync signal. In that case, equation (13) may be rewritten as follows:

$$\Delta \Phi = -\tfrac{1}{2}\alpha n + (1-n)(100-d)/100\alpha + m\alpha \qquad (17).$$

In such case, by suitably selecting the scales of the frequency and phase deviations $\Delta H$ and $\Delta \Phi$, boundary lines extending at 45° to the coordinates can be obtained in the same manner as shown in FIG. 7, and jump control can be effected on the basis of regions divided by suitable sums of the data $\Delta H + \Delta \Phi$.

In the illustrated embodiment of the invention, the frequency deviation $\Delta H$ has been obtained by detecting variations in the horizontal period on the basis of the numbers of measured pulses $CP_1$ counted during the reproduced horizontal periods or multiples thereof. However, since the frequency deviation $\Delta H$ has been shown to be dependent on the reproducing tape speed or its ratio n to the normal tape speed, it will be apparent that the data $\Delta H$, or its equivalent, can be derived from the tape speed detected, for example, by a frequency generator driven by the capstan motor 3.

Although an illustrative embodiment of the present invention and a number of modifications thereof have been described in detail herein with reference to the accompanying drawings, it is to be understood that the invention is not limited to that precise embodiment and the specifically described modifications thereof, and that various further changes and modifications may be effected therein by one skilled in the art without departing from the scope or spirit of the invention, as defined in the appended claims.

What is claimed is:

1. An apparatus for reproducing video signals recorded in successive parallel tracks formed obliquely on a record tape comprising: a rotary head movable across the tape in a direction generally along the tracks for reproducing the signals recorded therein; means for advancing the tape at a selected speed during said reproducing of the recorded signals; head deflecting means responsive to an electrical drive signal for deflecting the head in a direction transverse to said direction along the tracks; first detecting means for detecting a deviation of the tape speed during reproducing from a normal speed therefor and providing a corresponding first output; second detecting means for detecting a phase deviation of a sync signal included in the reproduced signals in respect to a reference sync signal and providing a corresponding second output; means digitally adding said first and second outputs of the first and second detecting means for providing a digitally expressed added output comprised of a plurality of bits; and decoding means responsive to only upper bits of said added output for providing therefrom a respective jump signal which is included in said drive signal applied to said head deflecting means at the completion of the scanning of a track by said head for determining the next track to be scanned thereby.

2. An apparatus according to claim 1; in which said recorded video signals include horizontal sync signals at spaced apart locations along each of said tracks so that the frequency of the horizontal sync signals included in the signals reproduced by said rotary head when scanning one of said tracks is a function of said tape speed during reproducing; and in which said first detecting means includes means for separating the reproduced horizontal sync signals from said signals reproduced by said head, and means responsive to the frequency of said reproduced horizontal sync signals in respect to a reference frequency for providing said first output in correspondence to said deviation of the reproducing tape speed from said normal speed.

3. An apparatus according to claim 2; in which said first detecting means includes means for establishing, as said first output, a digitally expressed numerical value corresponding, in accordance with a first scale, to deviation of said frequency of the reproduced horizontal sync signals in respect to said reference frequency, and said second detecting means includes means for establishing, as said second output, a digitally expressed numerical value corresponding, in accordance with a second scale, to said phase deviation; said decoding means determines the amount and polarity of said jump signal on the basis of regions of a coordinates plane having said first and second scales as the abscissa and ordinate, respectively, with said regions corresponding to respective different conditions of said jump signal and being divided from each other by boundary lines each of which represents a respective constant numerical value of said added output; said first and second scales are selected so that said boundry lines are inclined at 45° in respect to said coordinates; and an origin of said coordinates is selected so that said constant numerical value of the added output representing each of said boundary lines corresponds to a carry of the least significant of said upper bits to which said decoding means is responsive.

4. An apparatus according to claim 3; further comprising check means receiving said first output from said first detecting means in successive periods and inhibiting the transmitting to the digital adding means of a change in said digitally expressed numerical value constituting said first output until said change in the digitally expressed numerical value continues for a predetermined number of said periods.

5. An apparatus according to claim 4; in which said check means includes shift register means made operative in each of said periods and having a first input receiving said digitally expressed numerical value from said first detecting means and a first delayed output which, on operation of said shift register means, delivers said first input delayed by one of said periods, comparator means receiving said first input and first delayed output of said shift register means and providing a comparison signal, said shift register means further has at least one additional input receiving said comparison signal and at least one additional delayed output for delivering said comparison signal delayed by one of said periods, gate-means receiving at least said comparison signal and said comparison signal delayed by one period to provide a latch signal only when the signals applied to said gate means agree with each other, and latch means latched by said latch signal for transmitting therethrough to said digital adding means any change in said digitally expressed numerical value from said first detecting means.

6. An apparatus according to claim 5; in which said digitally expressed numerical value from said first detecting means is comprised of a plurality of bits, and only upper bits of said digitally expressed numerical value are applied from said first detecting mens to said check means.

7. An apparatus according to claim 6; in which said first detecting means has a predetermined dynamic range; and further comprising second latch means interposed between said first detecting means and said check means, and means for periodically applying a latch signal to said second latch means and including gate means receiving said upper bits of the digitally expressed numerical value from said first detecting means and inhibiting the latching of said second latch means when said upper bits indicate said dynamic range of the first detecting means has been exceeded.

8. An apparatus according to claim 3; in which said means responsive to the frequency of said reproduced horizontal sync signal includes down-counting means, presetting means operative to preset said down-counting means to a preset value, means responsive to said reproduced horizontal sync signals to provide successive counting periods each equivalent to a whole multiple of the period of said reproduced horizontal sync signals, and pulse generating means made operative at the commencement of each said counting period to cause operation of said presetting means to preset said down-counting means to said preset value and thereafter to provide measured pulses counted by said down-counting means.

9. An apparatus according to claim 8; in which said recorded video signals further include vertical sync signals recorded at a predetermined location in each of said tracks and being included in the signals reproduced by said rotary head when scanning said location in the respective track; and in which said second detecting means includes second down-counting means, means for generating second measured pulses, presetting means operative in response to each said reference sync signal to preset said second down-counting means to a second preset value whereupon said second down-counting means counts said second measured pulses, and latch means operated in response to each of the reproduced vertical sync signals for latching through the count of said second down-counting means as said digitally expressed numerical value constituting said second output.

10. An apparatus according to claim 9; in which the frequency of the first-mentioned measured pulses relative to said counting period and the frequency of said second measured pulses relative to the period between the successive reference sync signals are to provide said first and second scales, respectively, and the first-mentioned preset value and said second preset value are selected to provide said origin of the coordinates.

11. An apparatus according to claim 3; in which said means digitally adding said first and second outputs includes first and second adders each having first and second sets of bit inputs, lower bits of said first and second outputs are applied to said first and second sets of bit inputs of said first adder and are added in the latter to provide a carry, upper bits of said first and second outputs are applied to said first and second sets of bit inputs of said second adder and are added in the latter together with said carry from said first adder for providing said added output.

12. An apparatus according to claim 1; in which said first detecting means includes means for establishing, as said first output, a digitally expressed numerical value corresponding, in accordance with a first scale, to a ratio of said tape speed during reproducing to said normal speed, and said second detecting means includes means for establishing, as said second output, a digitally expressed numerical value corresponding, in accordance with a second scale, to said phase deviation; said decoding means selectively generates a plurality of jump signals respectively corresponding to successive ranges of said digitally expressed added output and each providing a respective amount of deflection of said head in a predetermined direction; and said first and second scales are selected so that said successive ranges of said digitally expressed added output are divided by numerical values of the latter each corresponding to a carry of the least significant of said upper bits to which said decoding means is responsive.

13. An apparatus according to claim 12; further comprising check means receiving said first output from said first detecting means in successive periods and inhibiting the transmitting to the digital adding means of a change in said digitally expressed numerical value constituting said first output until said change in the digitally expressed numerical value continues for a predetermined number of said periods.

14. An apparatus according to claim 13; in which said check means includes shift register means made operative in each of said periods and having a first input receiving said digitally expressed numerical value from said first detecting means and a first delayed output which, on operation of said shift register means, delivers said first input delayed by one of said periods, comparator means receiving said first input and first delayed output of said shift register means and providing a comparison signal, said shift register means further has at least one additional input receiving said comparison signal and at least one additional delayed output for delivering said comparison signal delayed by one of said periods, gate-means receiving at least said comparison signal and said comparison signal delayed by one period to provide a latch signal only when the signals applied to said gate means agree with each other, and latch means latched by said latch signal for transmitting therethrough to said digital adding means any change in said digitally expressed numerical value from said first detecting means.

15. An apparatus according to claim 14; in which said digitally expressed numerical value from said first detecting means is comprised of a plurality of bits, and only upper bits of said digitally expressed numerical value are applied from said first detecting means to said check means.

16. An apparatus according to claim 15; in which said first detecting means has a predetermined dynamic range; and further comprising second latch means interposed between said first detecting means and said check means, and means for periodically applying a latch signal to said second latch means and including gate means receiving said upper bits of the digitally expressed numerical value from said first detecting means and inhibiting the latching of said second latch means when said upper bits indicate said dynamic range of the first detecting means has been exceeded.

17. An apparatus according to claim 12; in which said recorded video signals include horizontal sync signals at spaced apart locations along each of said tracks so that the frequency of the horizontal sync signals included in the signals reproduced by said rotary head when scanning one of said tracks is a function of said tape speed during reproducing; and in which said first detecting means includes means for separating the reproduced horizontal sync signals from said signals reproduced by said head, and means responsive to the frequency of said reproduced horizontal sync signals in respect to a reference frequency corresponding to said normal speed for providing said first output in correspondence to said reproducing tape speed ratio.

18. An apparatus according to claim 17; in which said means responsive to the frequency of said reproduced horizontal sync signal includes down-counting means, presetting means operative to preset said down-counting means to a preset value, means responsive to said reproduced horizontal sync signals to provide successive counting periods each equivalent to a whole multiple of the period of said reproduced horizontal sync signals, and pulse generating means made operative at the commencement of each said counting period to cause operation of said presetting means to preset said down-counting means to said preset value and thereafter to provide measured pulses counted by said down-counting means.

19. An apparatus according to claim 18; in which said recorded video signals further include vertical sync signals recorded at a predetermined location in each of said tracks and being included in the signals reproduced by said rotary head when scanning said location in the respective track; and in which said second detecting means includes second down-counting means, means for generating second measured pulses, presetting means operative in response to each said reference sync signal to preset said second down-counting means to a second preset value whereupon said second down-counting means counts said second measured pulses, and latch means operated in response to each of the reproduced vertical sync signals for latching through the count of said second down-counting means as said digitally expressed numerical value constituting said second output.

20. An apparatus according to claim 19; in which the frequency of the first-mentioned measured pulses relative to said counting period and the frequency of said second measured pulses relative to the period between the successive reference sync signals are selected to provide said first and second scales, respectively, and the first-mentioned preset value and said second preset value are selected to provide origins of said scales in respect to said tape speed ratio and said phase deviation for establishing each division between said successive ranges at a carry of said least significant of the upper bits to which said decoding means is responsive.

21. An apparatus according to claim 12; in which said means digitally adding said first and second outputs includes first and second adders each having first and second sets of bit inputs, lower bits of said first and second outputs are applied to said first and second sets of bit inputs of said first adder and are added in the latter to provide a carry, upper bits of said first and second outputs are applied to said first and second sets of bit inputs of said second adder and are added in the latter together with said carry from said first adder for providing said added output.

* * * * *